(12) United States Patent
Thomas et al.

(10) Patent No.: US 9,197,284 B2
(45) Date of Patent: Nov. 24, 2015

(54) METHOD AND APPARATUS FOR PILOT SIGNAL PROCESSING IN A WIRELESS COMMUNICATION SYSTEM

(75) Inventors: Timothy A. Thomas, Palatine, IL (US); Bishwarup Mondal, Oak Park, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 787 days.

(21) Appl. No.: 12/958,512

(22) Filed: Dec. 2, 2010

(65) Prior Publication Data

US 2011/0176581 A1 Jul. 21, 2011

Related U.S. Application Data

(60) Provisional application No. 61/295,187, filed on Jan. 15, 2010.

(51) Int. Cl.
| | |
|---|---|
| *H04B 1/00* | (2006.01) |
| *H04B 1/7097* | (2011.01) |
| *H04B 1/7075* | (2011.01) |
| *H04J 13/00* | (2011.01) |
| *H04J 13/16* | (2011.01) |
| *H04L 27/26* | (2006.01) |
| *H04L 5/00* | (2006.01) |

(52) U.S. Cl.
CPC ............ *H04B 1/7097* (2013.01); *H04B 1/7075* (2013.01); *H04J 13/0062* (2013.01); *H04J 13/16* (2013.01); *H04L 5/0026* (2013.01); *H04L 27/2611* (2013.01); *H04B 2201/70701* (2013.01); *H04B 2201/709709* (2013.01); *H04L 5/0023* (2013.01); *H04L 5/0048* (2013.01)

(58) Field of Classification Search
CPC ............................ H04L 1/0057; H04J 13/004
See application file for complete search history.

(56) References Cited

U.S. PATENT DOCUMENTS

| 7,773,535 B2 | 8/2010 | Vook et al. | |
|---|---|---|---|
| 2005/0265290 A1 | 12/2005 | Hochwald et al. | |
| 2007/0098050 A1* | 5/2007 | Khandekar et al. | 375/146 |
| 2007/0135166 A1* | 6/2007 | Ding et al. | 455/561 |

(Continued)

FOREIGN PATENT DOCUMENTS

WO 2010091423 A2 8/2010

OTHER PUBLICATIONS

Panasonic: "Inter-cell CSI-RS Design", 3GPP TSG RAN WG1 Meeting #59, R1-094506, Jeju, Korea, Nov. 9-13, 2009, all pages.

(Continued)

*Primary Examiner* — John Blanton
(74) *Attorney, Agent, or Firm* — Faegre Baker Daniels LLP

(57) ABSTRACT

A wireless communication system is provided that spreads pilot signals, or channel state information reference signals (CSI-RSs), using a spreading code chosen from a set of mutually unbiased bases (MUBs). The advantages of such spreading with MUBs are that multiple base stations can send their pilot signals on a same time-frequency resources, making the pilot signal design very efficient and also improving channel estimation at a user equipment through orthogonal and quasi-orthogonal spreading which gives a gain above noise and interference. A short spreading code chosen from MUBs may be used for spreading pilot signals transmitted from each antenna of a base station within a time-frequency resource comprising multiple closely-spaced subcarriers in frequency and/or multiple closely-spaced symbols in time.

29 Claims, 12 Drawing Sheets

(56) References Cited

U.S. PATENT DOCUMENTS

| | | | |
|---|---|---|---|
| 2008/0267271 | A1 | 10/2008 | Vook et al. |
| 2008/0273494 | A1 | 11/2008 | Vook et al. |
| 2009/0196164 | A1 | 8/2009 | Vook et al. |
| 2010/0014660 | A1* | 1/2010 | Kishiyama et al. ............. 380/31 |
| 2010/0150266 | A1 | 6/2010 | Mondal et al. |
| 2010/0238975 | A1* | 9/2010 | Nakao et al. .................. 375/130 |
| 2010/0260234 | A1 | 10/2010 | Thomas et al. |
| 2011/0135024 | A1* | 6/2011 | Seo et al. ....................... 375/260 |
| 2012/0052875 | A1* | 3/2012 | Kangas et al. ............. 455/456.1 |

OTHER PUBLICATIONS

Catt: "Important issues concerning CSI-RS for both FDD and TOD", 3GPP TSG RAN WG1 Meeting #59, R1-094547, Jeju, Korea, Nov. 9-13, 2009, all pages.

Samsung: "Discussions on CSI-RS for LTE-Advanced", 3GPP TSG RAN WG1 #59, R1-094574 Jeju, Korea, Nov. 9-13, 2009, all pages.

Nokia Nokia Siemens Networks: "Inter-cell CSI-RS design and performance", 3GPP TSG-RAN WG1 Meeting #59, R1-094648, Jeju, Korea, Nov. 9-13, 2009, all pages.

Motorola: "Cyclic Shift Multiplexing of CSI-RS", 3GPP TSG RAN1 #59, R1-094850, Jeju, South Korea, Nov. 9-13, 2009, all pages.

Qualcomm Europe: "Details of CSI-RS", 3GPP TSG-RAN WG1 #59, R1-094867, Jeju, Korea, Nov. 9-13, 2009, all pages.

Fujitsu: "Multi-cell CSI-RS design considerations", 3GPP TSG-RAN1 #59, R1-094942, Jeju, Korea, Nov. 9-13, 2009, all pages.

Huawei: "Further design and evaluation on CSI-RS for LTE-A", 3GPP Draft; R1-094704, 3rd Generation Partnership Project (3GPP), Mobile Competence Centre; 650, Route Des Lucioles; F-06921 Sophia-Antipolis Cedex; France, no. Jeju, Nov. 9, 2009, all pages.

Robert W. Heath et al.: "On Quasi-Orthogonal Signatures for CDMA Systems", IEEE Transactions on Information Theory, vol. 52, No. 3, Mar. 31, 2006, pp. 1217-1225.

Bishwarup Mondal et al.: "Rank-Independent Codebook Design from a Quanternary Alphabet", Signals, Systems and Computers, 2007, ACSSC 2007, Conference Record of the Forty-First Asilomar Conference on, IEEE, Piscataway, NJ, USA Nov. 4, 2007, pp. 297-301.

Sari H et al.: "Increasing the capacity of CDMA using hybrid spreading sequences and iterative multistage detection", Vehicular Technology Conference, 1999, VTC 1999-Fall, IEEE VTS 50th Amsterdam, Netherlands Sep. 19-22, 1999, Piscataway, NJ, USA, IEEE, US vol. 2, Sep. 19, 1999, all pages.

Patent Cooperation Treaty, International Search Report and Written Opinion of the International Searching Authority for International Application No. PCT/US2010/062461, Apr. 7, 2011, 13 pages.

Timothy A. Thomas, Bishwarup Mondal, and Amitava Ghosh: "CSI Reference Signal Designs for Enabling Closed- Loop MIMO Feedback", Vehicular Technology Conference Fall (VTC 2010-Fall), 2010 IEEE 72nd, Sep. 6-9, 2010, Ottawa, ON ISSN: 1090-3038, all pages.

Popovic, B.M., "Generalized Chirp-Like Polyphase Sequences with Optimum Correlation Properties," IEEE Trans. On Information Theory, vol. 38, No. 4, Jul. 1992.

\* cited by examiner

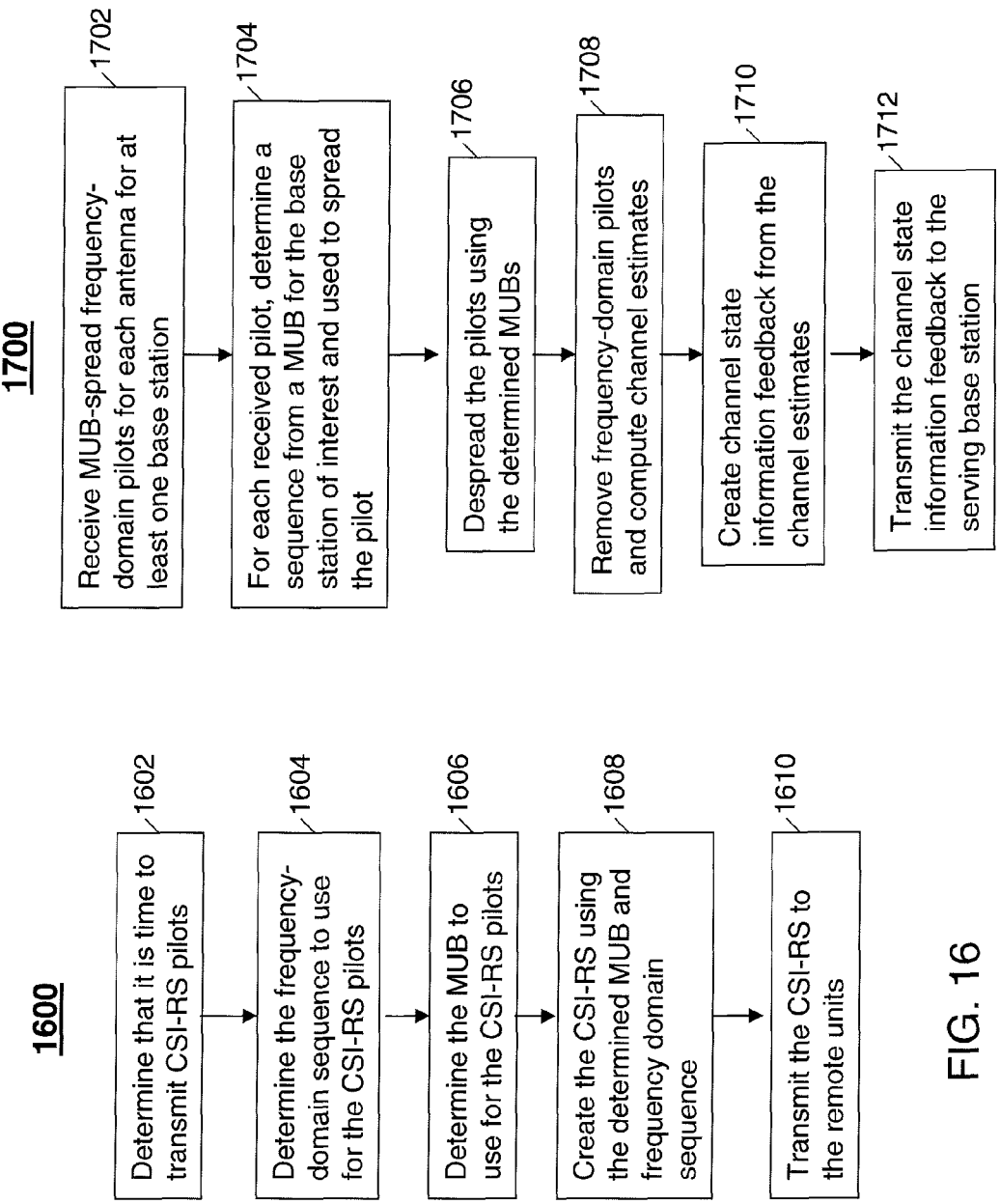

METHOD AND APPARATUS FOR PILOT SIGNAL PROCESSING IN A WIRELESS COMMUNICATION SYSTEM

CROSS-REFERENCE TO RELATED APPLICATION

This application claims priority from provisional application Ser. No. 61/295,187, entitled "METHOD AND APPARATUS FOR PILOT SIGNAL PROCESSING IN A WIRELESS COMMUNICATION SYSTEM,", filed Jan. 15, 2010, which is commonly owned and incorporated herein by reference in its entirety.

FIELD OF THE INVENTION

The present disclosure relates generally to wireless communication systems, and more particularly to processing of a pilot or reference signal in a wireless communication system.

BACKGROUND

In wireless communication systems, transmission techniques involving multiple antennas are often categorized as open-loop or closed-loop, depending on the level or degree of channel response information used by the transmission algorithm. Open-loop techniques do not rely on the information of the spatial channel response between the transmitting device and the receiving device. They typically involve either no feedback or the feedback of the long term statistical information that a base unit may use to choose between different open loop techniques. Open-loop techniques include transmit diversity, delay diversity, and space-time coding techniques such as the Alamouti space-time block code.

Closed-loop transmission techniques utilize knowledge of the channel response to weigh the information transmitted from multiple antennas. To enable a closed-loop transmit array to operate adaptively, the array must apply transmit weights derived from channel state information (CSI) between each of the transmitter's antennas and each of the receiver's antennas which may include the channel response, its statistics or characteristics, or a combination thereof. One method to obtain the CSI is through a feedback channel between the receiver and the transmitter. This CSI feedback channel may consist of any technique known in the art such as analog feedback of the channels, analog feedback of the statistics (e.g., the covariance matrix or the eigenvector/eigenvectors), quantized feedback of the statistics, quantized feedback of the channel, or codebook feedback.

In order to calculate any of the CSI feedback needed for closed-loop operation, the transmitter must have a mechanism that enables the receiver to estimate the channel between the transmitter's antennas and the receiver's antennas. The channel estimation between the transmit and the receive antennas is also needed for the calculation of non-spatial feedback information including modulation and coding rate (MCS), sub-band selection that are applicable for both open-loop and closed-loop transmissions. The usual mechanism to enable the channel estimation by the receiver is by the transmitter sending pilot signals (also known as reference symbols) from each of the transmit antennas which essentially sound the channel. A pilot signal (also known as reference symbols or RSs) is a set of symbols known by both the transmitter and receiver. The mobile would then use the pilot signals to compute channel estimates which can then be used to determine the CSI feedback. Typical methods for pilot transmission use a frequency-domain pilot sequence and possibly some spreading of the pilot signal with repetition or a Walsh code. The frequency-domain pilot sequence would be different for each unique transmitter and the sequences are typically designed to have a low correlation between transmitters to keep interference at a low level. The frequency-domain sequence can be made to be orthogonal between a limited set of base stations, but to do so requires a substantial increase in the pilot density in frequency. The Walsh codes if properly used can provide some orthogonality to transmitters, but are limited to a few orthogonal codes which are insufficient to keep interference at a minimum when there are many interferers. Also the Walsh codes are limited to being only orthogonal between the small set of transmitters and cannot be quasi orthogonal to a much larger set of transmitters (where quasi-orthogonality means a guaranteed level of interference suppression such as 6.0 dB).

While the above-techniques for pilot signal transmission may provide a mechanism for pilot signal transmission for use in CSI determination, the methods are not optimized for multi-transmitter operation which needs both orthogonal and quasi-orthogonal pilot signals. Thus there is a need for an improved pilot signal design without the need of increasing the pilot density in frequency for enabling optimal CSI determination at a receiver.

BRIEF DESCRIPTION OF THE DRAWINGS

FIG. 16 is a logic flow diagram illustrating a method executed by a base station of FIG. 1 in generating a pilot signal in accordance with an embodiment of the present invention.

FIG. 17 is a logic flow diagram illustrating a method executed by a user equipment of FIG. 1 in receiving and processing of pilot signal in accordance with an embodiment of the present invention.

Figure 1:
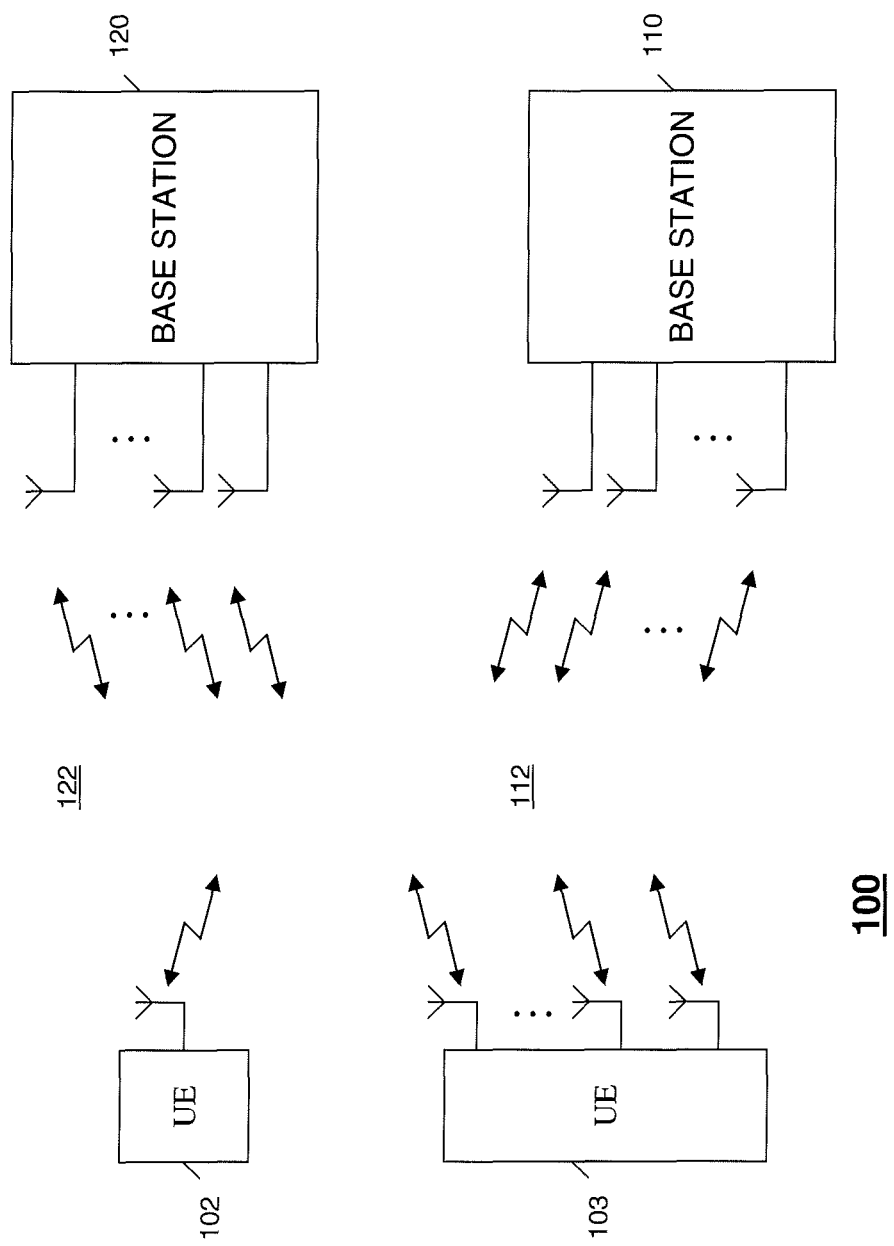
FIG. 1 is a block diagram of a wireless communication system in accordance with an embodiment of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

In order to address the need for an improved pilot signal design for enabling optimal channel state information (CSI) determination at a receiver, a wireless communication system is provided that spreads pilot signals, or channel state information reference signals (CSI-RSs), using a spreading code chosen from a set of mutually unbiased bases (MUBs). The advantages of such spreading with MUBs are that multiple base stations can send their pilot signals on a same time-frequency resources, making the pilot signal design very efficient and also improving channel estimation at a user equipment through orthogonal and quasi-orthogonal spreading which gives a gain above noise and interference. A short spreading code chosen from MUBs may be used for spreading pilot signals transmitted from each antenna of a base station within a time-frequency resource comprising multiple closely-spaced subcarriers in frequency and/or multiple closely-spaced symbols in time.

Generally, an embodiment of the present invention encompasses a method for pilot signal processing in a wireless communication system, the method comprising determining a sequence from a multiple mutually unbiased bases to use to spread a pilot signal for transmission via an antenna of multiple antennas and spreading the pilot signal using the determined sequence to produce a spread pilot signal.

Another embodiment of the present invention encompasses a method for pilot signal processing in a wireless communication system, the method comprising receiving a pilot signal via an air interface, determining a sequence from multiple mutually unbiased bases to use to despread the received pilot signal, and despreading the pilot signal using the determined sequence to produce a despread pilot signal.

Yet another embodiment of the present invention encompasses a base station capable of pilot signal processing in a wireless communication system, the base station comprising multiple antennas and mutually unbiased bases circuitry that is configured to determine a sequence from a plurality of mutually unbiased bases to use to spread a pilot signal for transmission via an antenna of the multiple antennas and spread the pilot signal using the determined sequence to produce a spread pilot signal.

Still another embodiment of the present invention encompasses a user equipment capable of pilot signal processing in a wireless communication system, the user equipment comprising receiving circuitry that receives a pilot signal via an air interface and mutually unbiased bases circuitry that is configured to determine a sequence from a plurality of mutually unbiased bases to use to despread the received pilot signal and despread the pilot signal using the determined sequence to produce a despread pilot signal.

The present invention may be more fully described with reference to FIGS. 1-17. FIG. 1 is a block diagram of a wireless communication system 100 in accordance with an embodiment of the present invention. Communication system 100 includes multiple users' equipment (UEs) 102, 103 (two shown), such as but not limited to a cellular telephone, a radio telephone, a personal digital assistant (PDA) with radio frequency (RF) capabilities, or a wireless modem that provides RF access to digital terminal equipment (DTE) such as a laptop computer. In various technologies, the UEs may be referred to as mobile stations (MSs), subscriber units (SUs), subscriber stations (SSs), access terminals (ATs), and the like. Communication system 100 further includes multiple base stations (BSs) 110, 120 (two shown), such as a Node B, an eNode B, an Access Point (AP), or a Base Transceiver Station (BTS), that supports Multiple-Input Multiple-Output (MIMO) communications and that each provides communication services, via a corresponding air interface 112, 122, to users' equipment, such as UEs 102 and 103, residing in a coverage area, such as a cell, served by the base station (BS). Each air interface 112, 122 comprises a downlink and an uplink, that in turn each comprises multiple physical communication channels, including multiple control/signaling channels and multiple traffic channels.

Figure 12:
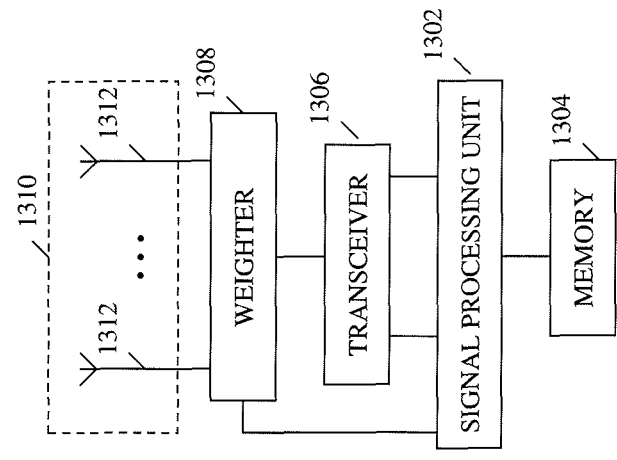
FIG. 12 is a block diagram of a user equipment of FIG. 1 in accordance with an embodiment of the present invention.
Figure 13:
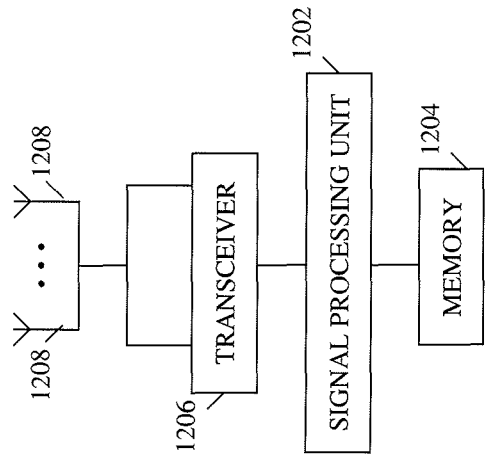
FIG. 13 is a block diagram of a base station of FIG. 1 in accordance with an embodiment of the present invention.

Referring now to FIGS. 12 and 13, block diagrams are provided of a UE 1200, such as UEs 102 and 103, and a BS 1300, such as BSs 110 and 120, in accordance with various embodiments of the present invention. Each of UE 1200 and BS 1300 includes a respective signal processing unit 1202, 1302, such as one or more microsignal processing units, microcontrollers, digital signal processing units (DSPs), combinations thereof or such other devices known to those having ordinary skill in the art. The particular operations/functions of signal processing units 1202 and 1302, and respectively thus of UE 1200 and BS 1300, are determined by an execution of software instructions and routines that are stored in a respective at least one memory device 1204, 1304 associated with the signal processing unit, such as random access memory (RAM), dynamic random access memory (DRAM), and/or read only memory (ROM) or equivalents thereof, that store data and programs that may be executed by the corresponding signal processing unit. The at least one memory devices 1204, 1304 of UE 1200 and BS 1300 further store frequency-domain scrambling sequences and mutually unbiased bases (MUBs), such as multi-dimensional matrices, that are applied to pilot signals, or channel state information reference signals (CSI-RSs), as described in greater detail below. The frequency-domain scrambling sequences and the MUBs may be pre-programmed into the at least one memory devices 1204, 1304 or may be provisioned, by communication system 100, to the BS and UE and stored by the BS and UE in the at least one memory devices. For example, communication system 100 may provision one or more MUBs to a BS and the BS then may communicate its MUBs to all UEs served by the BS.

Each of UE 1200 and BS 1300 further includes a respective transceiver 1206, 1306 coupled to the signal processing unit 1202, 1302 of the UE or BS. Each transceiver 1206, 1306 includes receiving circuitry (not shown) and transmitting circuitry (not shown) for receiving and transmitting signals over an air interface, such as air interfaces 112 and 122. UE 1200 includes one or more antennas 1208 and, in the event the UE comprises multiple antennas, may support MIMO communications. BS 1300 includes an antenna array 1310 that is in communication with transceiver 1306 and that comprises multiple antennas 1312 (three shown). By utilizing an antenna array to transmit signals to a UE located in a coverage area of the BS, such as a cell or sector serviced by the antenna array, the BS is able to utilize MIMO techniques for the transmission of the signals.

BS 1300 further includes a weighter 1308, such as a precoder or any other type of signal weighter, that is coupled to signal processing unit 1302 and that is interposed between antenna array 1310 and transceiver 1306. In another embodiment of the present invention, weighter 1308 may be implemented by signal processing unit 1302. Weighter 1308 weights signals applied to the multiple antennas 1312 of the BS based on channel state information (CSI) fed back by a UE, for example, codebook feedback such as a codebook index and a rank index, statistical feedback such as a covariance matrix or any other type of matrix, eignevectors, or channel quality mean and variance, a received signal quality information, a channel frequency response, or any other type of channel feedback known in the art, in order to predistort and beamform the signals for transmission to the UE over the downlink of the intervening air interface.

When weighter 1308 comprises a precoder, each of UE 1200 and BS 1300 may further maintain, in at least one memory devices 1204 and 1304 and/or in precoder 1308, a precoding matrix, which precoding matrix comprises multiple sets of matrices and wherein each set of matrices is associated with a combination of antennas for downlink transmission and with weights applicable to each antenna. Precoding matrices are well-known in the art and will not be described in greater detail. Based on the channel conditions measured by a UE, the UE reports back a precoding metric, preferably a Precoding Matrix Indicator (PMI), for a group of resource blocks (RBs) where an RB is a time-frequency resource such as a 12 subcarriers in frequency by 7 OFDM symbols in time. In determining a precoding metric for an group of RBs, the UE computes a set of complex weights based on the measured channel conditions. The set of complex weights can be Eigen Beamforming vectors derived from downlink reference signal measurements. The complex weights are mapped to a set of already defined vectors, that it, to a nearest vector of the set of already defined vectors, to produce a precoding vector. The UE then conveys the index of the precoding vector selected by the UE using an uplink control channel.

The embodiments of the present invention preferably are implemented within UEs 102 and 103 and BSs 110 and 120, and more particularly with or in software programs and instructions stored in the at least one memory devices 1204, 1304 and executed by signal processing units 1202, 1302 of the UEs and BSs. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UE 102 and 103 and BSs 110 and 120. Based on the present disclosure, one skilled in the art will be readily capable of producing and implementing such software and/or hardware without undo experimentation.

Preferably, communication system 100 comprises a wideband communication system that employs an Orthogonal Frequency Division Multiplexing Access (OFDMA) modulation scheme for transmitting data over an air interface, wherein a frequency bandwidth employed by the communication system is split into multiple frequency sub-bands, or Physical Resource Blocks (PRBs), during a given time period. Each PRB comprises multiple orthogonal frequency subcarriers over a given number of OFDM symbols, or time slots, that are the physical layer channels over which traffic and signaling channels are transmitted in a TDM or TDM/FDM fashion. From another perspective, each PRB includes multiple resource elements, wherein each resource element (RE) comprises a frequency subcarrier over an OFDM symbol.

In addition, communication system 100 preferably comprises a 3GPP (Third Generation Partnership Project) Long Term Evolution (LTE) communication system, which LTE standards specify wireless telecommunications system operating protocols, including radio system parameters and call processing procedures. However, those who are of ordinary skill in the art realize that communication system 100 may operate in accordance with any wireless telecommunication system employing an Orthogonal Frequency Division Multiplexing (OFDM) modulation scheme, such as a 3GPP2 (Third Generation Partnership Project 2) Evolution or Phase 2 communication system, for example, a CDMA (Code Division Multiple Access) 2000 1XEV-DV communication system, a Wireless Local Area Network (WLAN) communication system as described by the IEEE (Institute of Electrical and Electronics Engineers) 802.xx standards, for example, the 802.11a/HiperLAN2, 802.11g, or 802.16 standards, or any of multiple proposed ultra wideband (UWB) communication systems. Although the preferred embodiment utilizes OFDMA, in still other embodiments of the present invention other multi-carrier modulation methods may be employed by communication system 100, such as interleaved frequency-division multiple access (IFDMA), DFT spread OFDM, multi-carrier code-division multiple access (MC-CDMA), multi-carrier direct sequence CDMA (MC-DS-CDMA), Orthogonal Frequency and Code Division Multiplexing (OFCDM), or cyclic-prefix single carrier.

Figure 2:
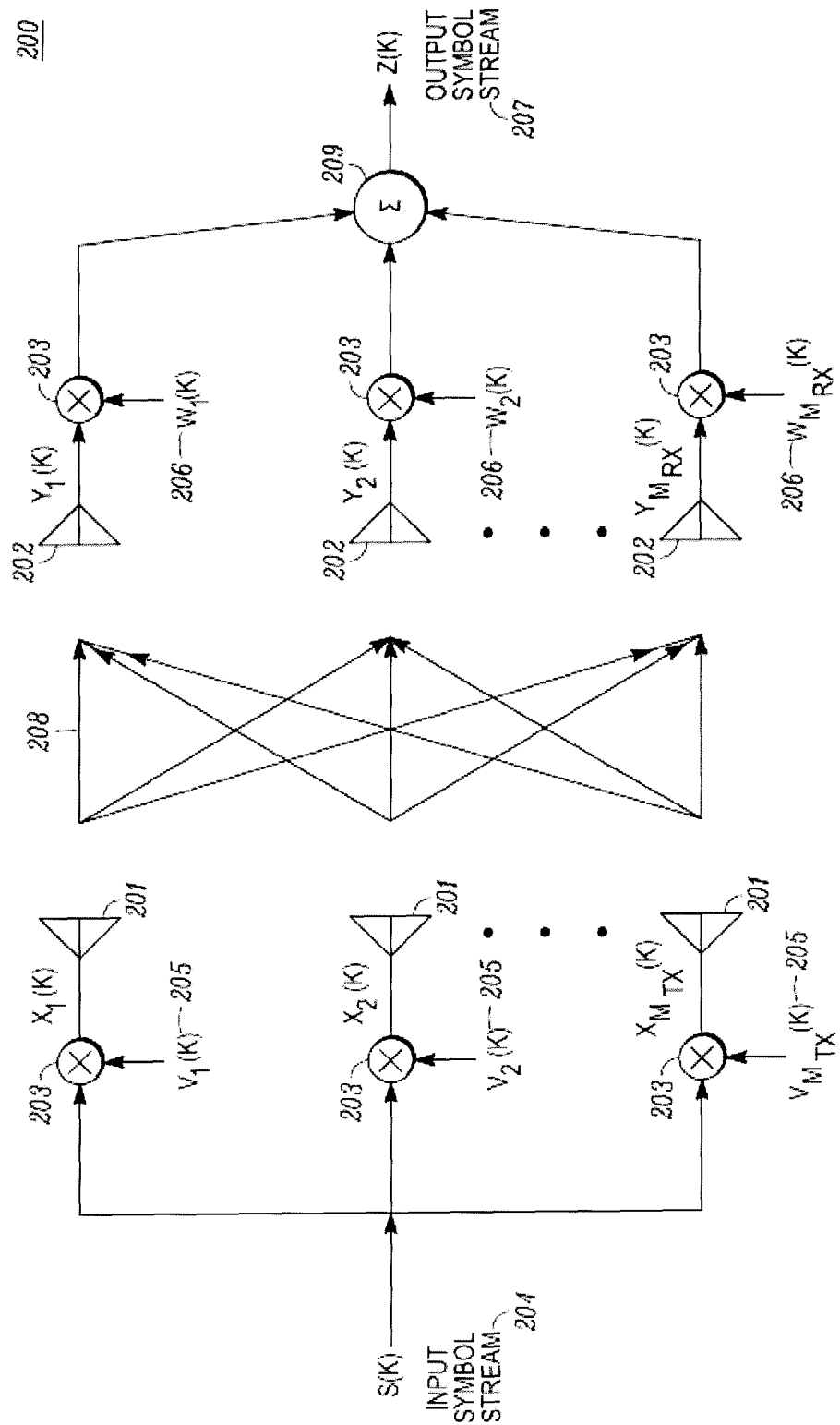
FIG. 2 is a block diagram illustration of a downlink signal transmission by the communication system of FIG. 1 in accordance with an embodiment of the present invention.

Referring now to FIG. 2, a block diagram is provided that illustrates a downlink signal transmission in communication system 100 in accordance with an embodiment of the present invention, wherein a transmit antenna array, such as antenna array 1310, that is part of a BS, such as BSs 110 and 120, communicates a single data stream to a UE, such as UEs 102 and 103, as part of the UE having one or more receive antennas, such as the one or more antennas 1208. At the BS, an input symbol stream 204 is divided into multiple parallel symbol streams and routed to a weighter, such as weighter 1308. The weighter multiplies each symbol stream of the multiple parallel symbol streams by a corresponding transmit weight 205 using a corresponding multiplier 203 to produce multiple weighted output streams. The transmit weights are based on at least a partial channel response, which is an example of tailoring a spatial characteristic of the transmission. Methods for determining the transmit weights from the channel response are discussed more fully below. The weighter then routes each weighted output stream of the multiple weighted output streams to one or more of multiple transmit antennas 201, such as antennas 1312, where the signals are transmitted over an interface, such as air interfaces 112 and 122.

The signals transmitted from the multiple transmit antennas 201 propagate through a matrix channel 208, such as over air interfaces 112 and 122, and are received by the one or more receive antennas 202, such as antennas 1208, of the UE. At the UE, the signals received on the one or more receive antennas 202 are routed via a transceiver to a signal processing unit, such as signal processing unit 1202, where the received signals are multiplied by receive weights 206 using multipliers 203 and are summed by a summation device 209 to produce an output symbol stream 207 that corresponds to input symbol stream 204. In embodiments where the transmitter has only a single antenna, the spatial characteristic of the transmit signal cannot be tailored. However, other characteristics of the transmit signal may be tailored based on at least a partial channel response, such as the complex gain of each subcarrier (e.g., in a pre-equalization application), or the modulation and coding used on the subcarriers of the transmit signal.

Figure 3:
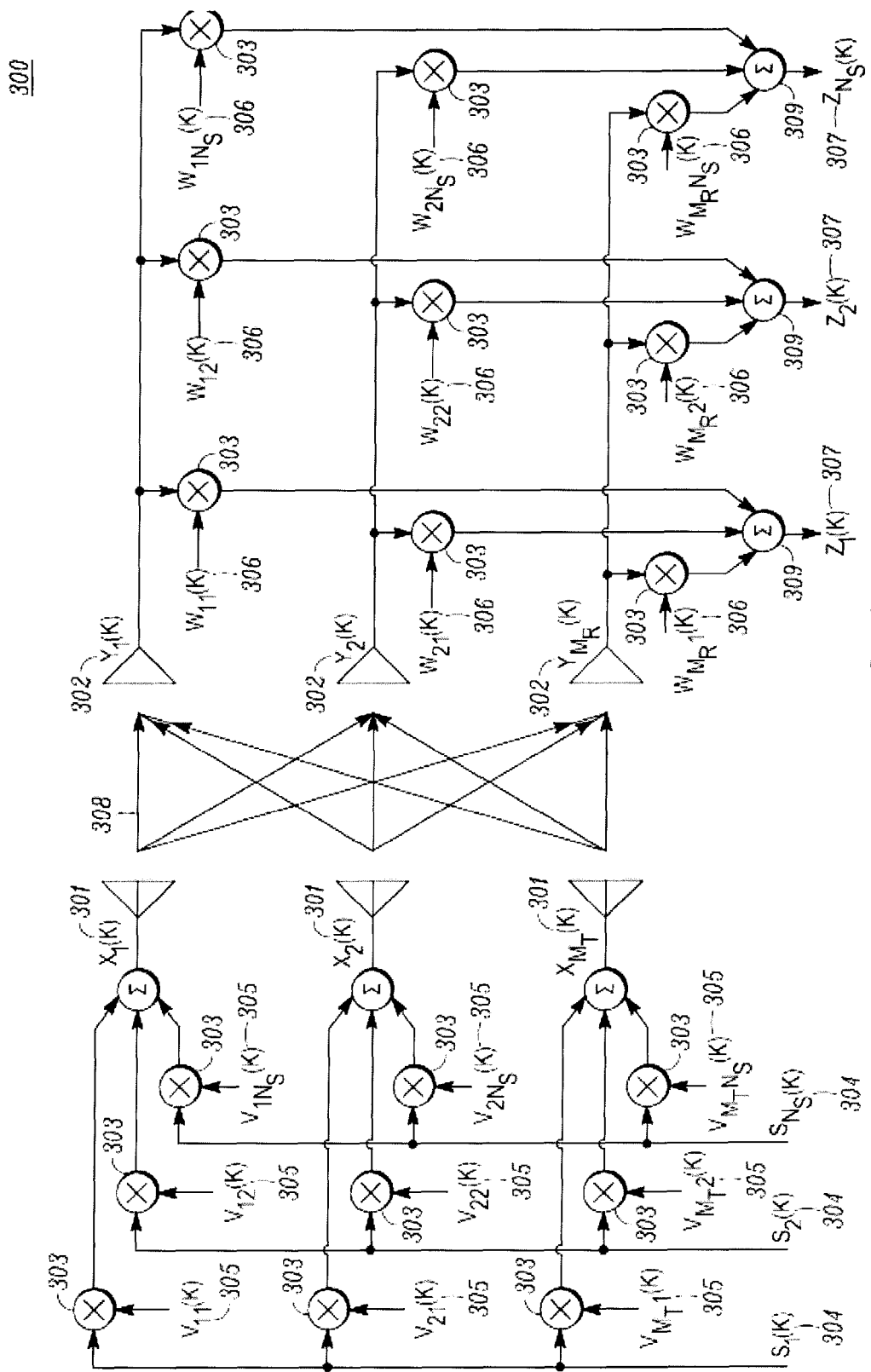
FIG. 3 is a block diagram illustration of a downlink signal transmission by the communication system of FIG. 1 in accordance with another embodiment of the present invention.

Referring now to FIG. 3, a block diagram is provided that illustrates a downlink signal transmission in communication system 100 in accordance with another embodiment of the present invention, wherein a transmit antenna array, such as antenna array 1310, that is part of a BS, such as BSs 110 and 120, communicates multiple data streams to a UE, such as UE 103, as part of the UE having more than one receive antenna, for example, a MIMO system. At the BS, each input symbol stream of multiple input symbol streams 304 is divided into multiple parallel symbol streams and routed to a weighter, such as weighter 1308. The weighter multiplies each symbol stream of the multiple parallel symbol streams by a corresponding transmit weight 305 using a corresponding multiplier 303 to produce multiple weighted output streams. Multiplying input streams 304 by transmit weights 305 where the transmit weights are based on at least a partial channel response and is another example of tailoring a spatial characteristic of the transmission. The weighter then routes each weighted output stream of the multiple weighted output streams to one or more of multiple transmit antennas, such as antennas 1312. For each transmit antenna, the signal streams routed to the antenna are combined at a combiner associated with the antenna to produce a transmission signal 301 and are transmitted via the transmit antenna over an interface, such as air interfaces 112 and 122.

The signals 301 transmitted from the multiple transmit antennas propagate through a matrix channel 308, such as over air interfaces 112 and 122, and are received by the multiple receive antennas, such as antennas 1208, of the UE to produce a received signal 302 at each receive antenna. At the UE, each received signal 302, received on a receive antenna of the multiple receive antennas, is routed via the antenna and a transceiver, such as transceiver 1206, to a signal processing unit, such as signal processing unit 1302, wherein the signal is multiplied by a receive weight 306 using a multiplier 303 to produce a weighted received signal. The signal processing unit then sums the weighted received signals using summation devices 309 to produce multiple output symbol streams 307 that correspond to the multiple input symbol streams 304. Other schemes for producing the output symbol streams 307 are possible, such as maximum likelihood detection or successive cancellation that may or may not use the receive weights 306 and the multipliers 303.

Figure 4:
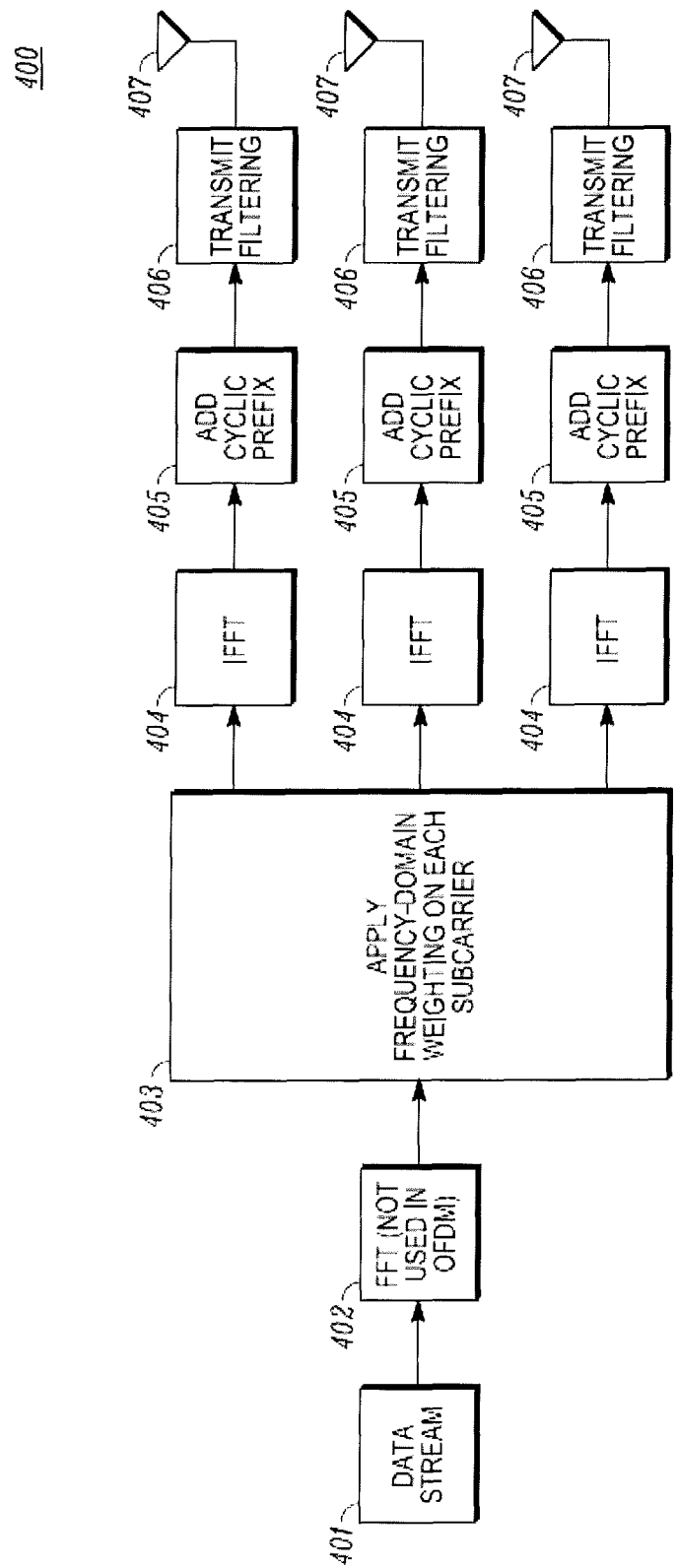
FIG. 4 is a block diagram illustration of an architecture of a base station of FIG. 1 in accordance with an embodiment of the present invention.

Referring now to FIG. 4, an architecture 400 is provided of the signal processing unit 1302 of BS 1300 in accordance with another embodiment of the present invention. As depicted in FIG. 4, the BS implements a frequency-domain oriented transmission system, such as OFDM or cyclic prefix single carrier (CP-Single Carrier), in which the transmission schemes of FIG. 2 and FIG. 3 are performed in the frequency domain prior to transmission. As depicted in FIG. 4, signal processing unit 1302 comprises one or more fast Fourier transforms (FFTs) 402, a frequency domain weighting apparatus 403 coupled to the one or more FFTs, one or more inverse fast Fourier transforms (IFFTs) 404 coupled to the frequency domain weighting apparatus, cyclic prefix (CP) adders 405 coupled to the IFFTs, and output filters 406 coupled to the CP adders.

Assuming a CP-Single Carrier system, signal processing unit 1302 transforms one or more input data streams 401 into the frequency domain using the one or more FFTs 402. The frequency domain data streams then are weighted by frequency domain weighting apparatus 403. In OFDM, the one or more data streams 401 are sent directly to frequency domain weighting apparatus 403 without the use of FFTs 402. Frequency domain weighting apparatus 403 implements the weighting function shown in the transmit portion of FIG. 2 and FIG. 3 on each subcarrier, or frequency bin, in the frequency domain. Thus, the transmit signal can be tailored either spatially, or in frequency, or both with this type of a system. The outputs of the frequency domain weighting apparatus 403 are then transformed back into the time domain by IFFTs 404. Cyclic prefixes are added at CP adders 405 as is known in the art, and transmit filtering then is performed at output filters 406 before routing the output signals 407 to transmit antennas 1312.

Among the signals being multiplexed and transmitted by BSs 110 and 120 and received by UEs 102 and 103 are pilot signals, which may be multiplexed with other control information and user data. As is mentioned above, pilot signals, that is, channel state information reference signals (CSI-RSs), need to be sent from every antenna of a serving BS in order for the UEs to determine the channel state information (CSI) that they feed back to a serving BS. In addition the UE may need to determine CSI for other BSs as well, which is needed for such techniques known in the art such as coordinated multipoint (CoMP) and null steering. An optimal pilot signal design should: (1) be scalable up to eight transmit antennas, (2) have good inter-cell (sector/eNodeB) interference rejection, which means that at least seven cells (and preferably nine) should have orthogonal or quasi-orthogonal pilot signals, (3) use minimal overhead (it is desirable that the pilot signals consume less than 2.0% of the overhead for eight transmit antennas and less than 1.0% of the overhead for four transmit antennas), and (4) support pilot boosting. Furthermore, optimally the pilot symbols should not be on OFDM symbols with control information or on OFDM symbols with common reference symbols. An good pilot signal design may further have the following desirable properties: (1) the covariance matrix used to determine CSI can be directly estimated from the pilots without the need to perform channel estimation for the simplest mobile operation, (2) the pilot signals enable good carrier to interference ratio (C/I) measurement at the mobile (useful for non-CoMP operation as well as CoMP operation), and (3) the pilot symbols are not in OFDM symbols that have mobile-specific reference symbols (dedicated pilots symbols).

Figure 5:
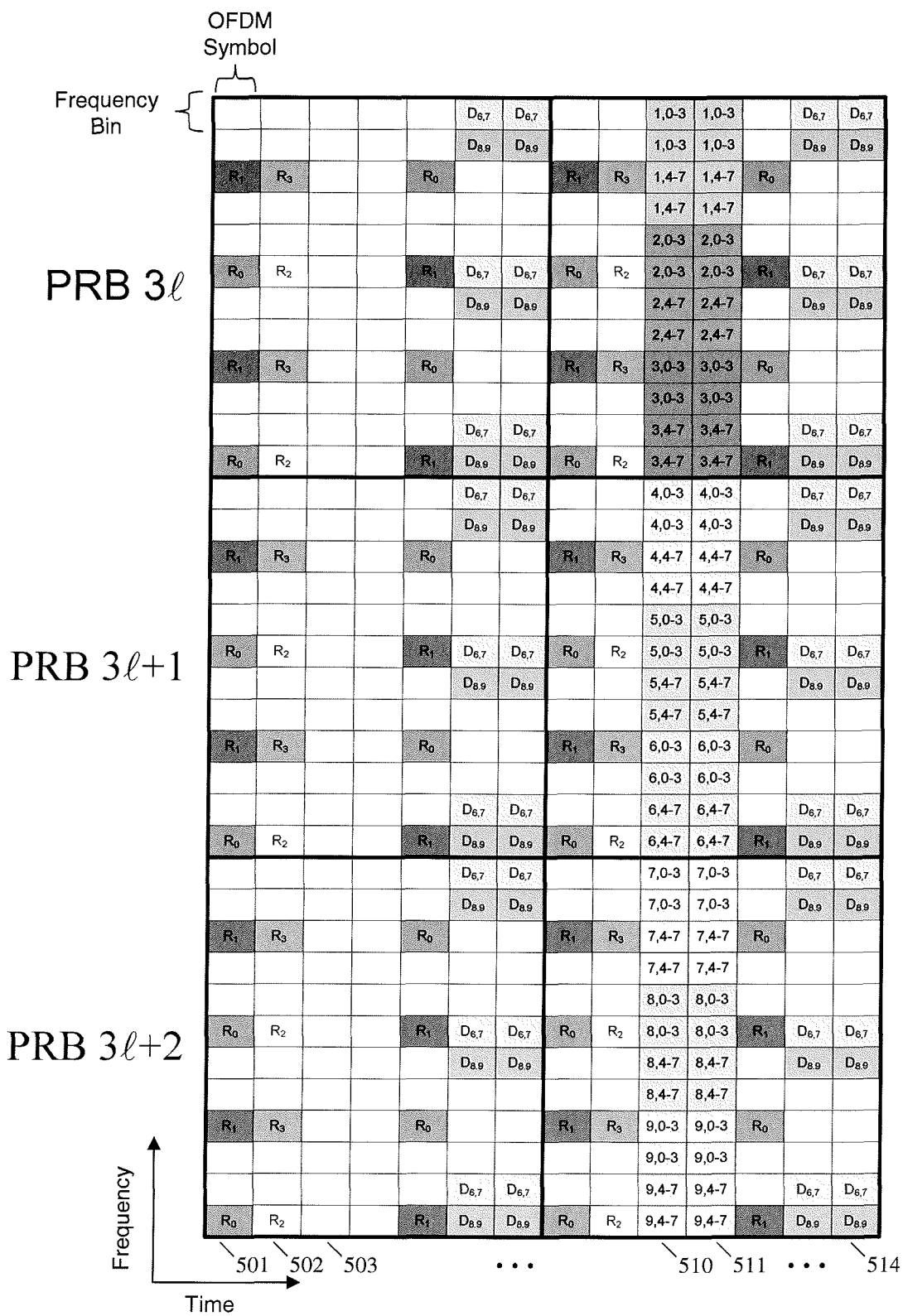
FIG. 5 is a time-frequency diagram of an OFDMA frequency bandwidth employed by the communication system of FIG. 1 and that illustrates pilot signal placement within the OFDMA frequency bandwidth in accordance with an embodiment of the present invention.

An exemplary CSI-RS format that may have one or more of these properties is depicted in FIG. 5, which is a time-frequency diagram 500 of an OFDMA frequency bandwidth that may be employed by communication system 100 in accordance with an embodiment of the present invention. A vertical scale of time-frequency diagram 500 depicts multiple blocks of frequency, or frequency bins, (frequency subcarriers) of the frequency bandwidth. A horizontal scale of time-frequency diagram 500 depicts multiple blocks of time (in units of OFDM symbols) 501-514 of a sub-frame that may be allocated. Time-frequency diagram 500 depicts three consecutive PRBs, that is, PRB 3l, PRB 3l+1, and PRB 3l+2, wherein each PRB comprises 12 OFDM subcarriers over 14 OFDM symbols. Thus, the PRBs may be considered to repeat in frequency in groups of 3 PRBs.

The pilot signals, or CSI-RSs, reside in the Resource Elements (REs), or tiles, of OFDM symbols 510 and 511. As depicted in FIG. 5, up to nine (9) different sectors or cells can be orthogonally received at a UE. An RE is a single OFDM subcarrier, or frequency bin, on a single OFDM symbol. For each RE comprising a CSI-RS, the first number depicted in the RE indicates a CSI-RS number (1-9) and the second number depicted in the RE indicates antenna/port numbers that use the given resource element (RE). The format can have a cell specific (and even antenna-specific) scrambling sequence applied as well across frequency (this sequence will also be referred to as a frequency-domain sequence). Four different antennas/ports may transmit a CSI-RS on a same RE, and these CSI-RSs are sent in a Code Division Multiplexing (CDM) fashion (e.g., using a Walsh spreading sequence or by using one of the MUB sequences defined below with respect to FIGS. 7-10). For example on the first two subcarriers in OFDM symbols 510 and 511 (a 2×2 block of REs, or tile), antennas 0-3 for one cell on physical resource block (PRB) 3l (one sector for a particular BS) transmit the following CSI-RSs:

| Tx 0 | $x_b^0(3l)$ | $x_b^0(3l)$ |
|---|---|---|
|  | $x_b^0(3l)$ | $x_b^0(3l)$ |

| Tx 1 | $x_b^1(3l)$ | $-x_b^1(3l)$ |
|---|---|---|
|  | $-x_b^1(3l)$ | $x_b^1(3l)$ |

| Tx 2 | $x_b^2(3l)$ | $-x_b^2(3l)$ |
|---|---|---|
|  | $x_b^2(3l)$ | $-x_b^2(3l)$ |

| Tx 3 | $x_b^3(3l)$ | $x_b^3(3l)$ |
|---|---|---|
|  | $-x_b^3(3l)$ | $-x_b^3(3l)$ | where $x_b^a(l)$ is a frequency-domain scrambling sequence (e.g., a Zadoff-Chu sequence or other suitable sequence) for antenna a and cell b. Other CSI-RS numbers and other antennas are similarly defined. For this CSI-RS format, all BSs must use the same CDM spreading sequences (e.g., they all use the same MUB as described below with respect to FIGS. 7-10) to ensure orthogonality, but still each BS and even each antenna can have different scrambling sequences across frequency. The shaded REs having an 'R' or a 'D' included are REs reserved for other pilot signals, either a common (R) pilot signal or a dedicated (D) pilot signal. These pilot signals may be present but are not useful for estimation of CSI by the UE. The pilot format in FIG. 5 is naturally valid for base-stations with less than 8 ports. In this case if a 2×2 tile is not needed for antenna ports 4-7, user data may be allocated in place of the pilot tile. The density of the pilot tiles in time and in frequency (for a particular base-station) may be controlled by control signals. The number of base-stations that a MS may be able to use for detection and measurement of CSI may also be controlled by a base-station.

Figure 6:
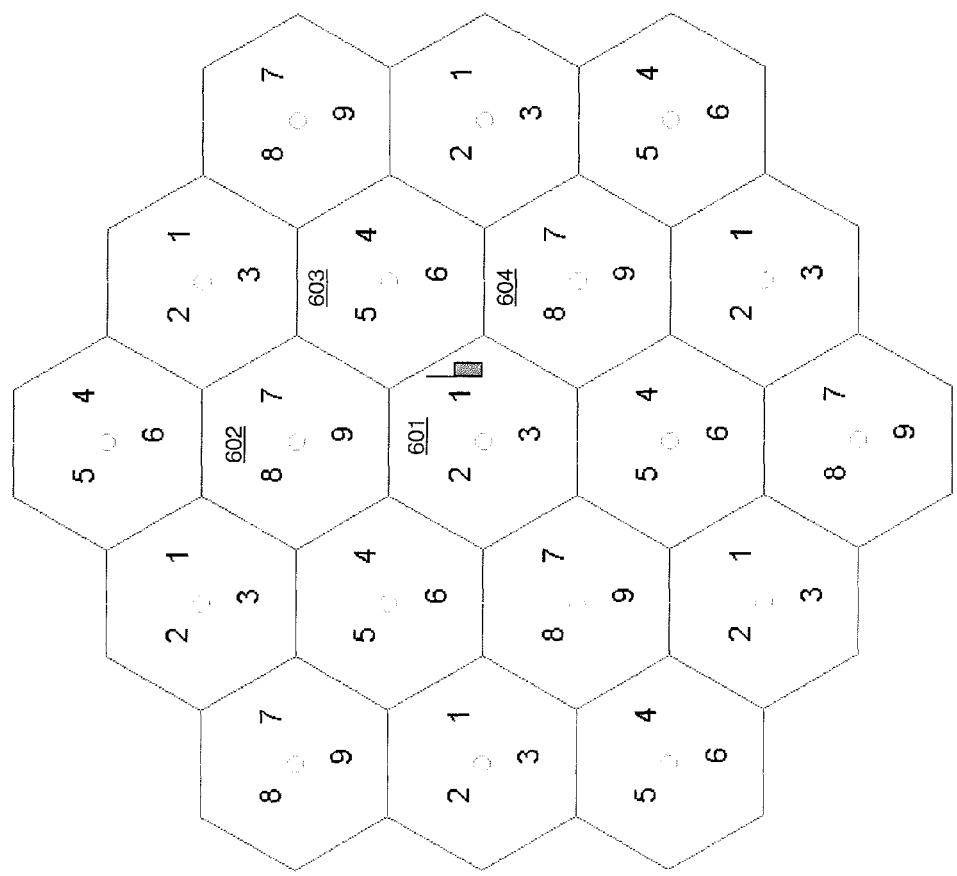
FIG. 6 is a block diagram depicting an exemplary cellular reuse plan employed by the wireless communication system of FIG. 1 in accordance with an embodiment of the present invention.

FIG. 6 is an exemplary cellular CSI-RS reuse plan that may employ the CSI-RS format depicted in FIG. 5. In the cellular reuse plan depicted in FIG. 6, a coverage area is divided into multiple cells, or BS coverage areas, that are each provided wireless service by a BS and each cell is, in turn, divided into three sectors. FIG. 6 also depicts the CSI-RS number allocated to each sector. Take, for example, a UE residing in the sector allocated CSI-RS 1 (the northeast sector) of the middle cell 601 (the number in the CSI-RS refers to the location or first number in the pilot sequences on OFDM symbols 510 and 511 in FIG. 5). This UE would need to be provided a list of cells adjacent to this sector, that is, cells 602-604 (to determine the appropriate frequency-domain scrambling sequence), and their CSI-RS numbers along with the CSI-RS number allocated to the sector containing the UE. In this case the CSI-RS numbers would be 1, 2, 3, 5, 6, 8, 9, that is, the sectors of cell 601 adjacent to the sector containing the UE are allocated CSI-RS 2 and CSI-RS 3, the sector of cell 602 adjacent to the sector containing the UE is allocated CSI-RS 9, the sectors of cell 603 adjacent to the sector containing the UE are allocated CSI-RS 5 and RS 6, and the sector of cell 602 adjacent to the sector containing the UE is allocated CSI-RS 8. The UE would monitor the CSI-RS of each of these sectors, compute a CSI estimate for each of these CSI-RS numbers, and report back to a serving cell the CSI for a desired, such as the serving, cell and also up to N other cells (e.g., N=2) if the power of the those cells are within some amount (e.g., 10 dB) of the desired cell. The desired cell would pass the CSI for the other cells onto the neighboring cells along with scheduling information so the other cells can either steer nulls toward the UE or can schedule around that UE. It may be noted that the reuse pattern for a given reuse factor is non-unique and the selection of a particular reuse pattern may be treated is a network optimization problem. It may be possible for a network to change the reuse pattern of CSI-RS with time (the change could be semi-static). It may also be possible for a network to overlay one reuse pattern with another where every alternate CSI-RS corresponds to the same reuse pattern.

One advantage of CSI-RS format depicted in FIG. 5 is that a covariance matrix can be estimated directly from the received pilot data without the need of computing a channel estimate on every subcarrier. Basically a UE can despread with the appropriate spreading code (after multiplying by the conjugate of $x_b^a(l)$ assuming $x_b^a(l)$ is constant modulus) to get a channel a channel estimate on each PRB for each antenna. Then these channel estimates on each PRB can be used to compute a covariance matrix estimate by averaging across frequency (e.g., over a group of PRBs for a localized covariance matrix estimate or over all PRBs to get a wideband covariance matrix estimate).

Within the structure of this pilot format, it is understood that the reuse factor and the density of RE per PRB presents a tradeoff. FIG. 5 shows a density of ⅓ RE per port per PRB and a reuse factor of nine (9). Using the same structure it is possible to have a density of one (1) RE per port per PRB and a reuse factor of three (3). It may be possible to support CSI-RS of multiple densities in the specification and use over-the-air signaling to inform a UE of the density and/or reuse factor of the transmitted CSI-RS. Note that with this format a UE may perform a channel estimate on every subcarrier especially when the CSI-RS density is high.

A drawback of prior-art techniques for pilot sequences is that they are not robust enough to handle strong intra-cell or inter-cell interference nor do they enable the feedback channel to support multiple users. In order to address these issues, communication system 100 spread pilot signals, or CSI-RSs, using a spreading code chosen from a set of mutually unbiased bases (MUBs). The advantages of such spreading with MUBs are that multiple BSs can send their pilot signals on the same time-frequency resources making the pilot signal design very efficient and also improving channel estimation at the UE through orthogonal and quasi-orthogonal spreading which gives a gain above noise and interference. A short spreading code chosen from MUBs may be used for spreading pilot signals transmitted from each antenna of a base station within a time-frequency resource. A time-frequency resource is comprised of multiple closely-spaced subcarriers in frequency and/or multiple closely-spaced symbols in time.

To understand the utility of a MUB for spreading and providing orthogonal and quasi-orthogonal sequences, let us first give a definition of a MUB. In a D-dimensional space, two bases A and B are defined as mutually unbiased, that is, are MUBs, if:

$$\langle a,b \rangle^2 = 1/D, \text{ for any } a \in A, \text{ and any } b \in B$$

where a and b are vectors and <·,·> denotes the cosine of the angle between the two vectors a and b. Hence, by using MUBs, a low cross-correlation value (i.e., 1/D, which for D=4 is 0.25 or −6 dB) is guaranteed between two spreading codes in different MUB sets, because of the initial construction of the MUBs (in addition this low cross-correlation value is the same for all pairs of different MUBs). This low cross-correlation is what is known as the quasi-orthogonality between different MUB sets, and correspondingly between different BSs when each BS employs a particular MUB set. It is known that D+1 such bases exist if D is a power of a prime number. In the particular case when D is a power of 2, it turns out that the D+1 MUBs can be constructed from the alphabet a where, in a preferred embodiment, the alphabet a consists of QPSK entries (i.e., 1, −1, +i and −i). The advantage of QPSK entries is that both the spreading and despreading operations can be accomplished with no multiplications and hence has a low computational complexity. In a particular dimension, a set of bases that are mutually unbiased is not unique. The MUBs described, therefore, are specific examples meant to illustrate the present invention and are not intended to limit the invention, and a particular embodiment may contain any set of bases that are mutually unbiased.

In the case of D=2 (corresponding to a spreading by a factor of 2), a MUB set comprises three (3) MUBs (the maximum possible for this dimension) that may be used to spread the pilot symbols and, in one example, includes bases A and B (2-dimensional matrices), given as:

$$A = \left(\frac{1}{\sqrt{2}}\right)\begin{bmatrix} 1 & 1 \\ 1 & -1 \end{bmatrix}, \quad B = \left(\frac{1}{\sqrt{2}}\right)\begin{bmatrix} 1 & 1 \\ i & -i \end{bmatrix},$$

and the 2×2 identity matrix I, which is a matrix of all zeros except for the diagonal elements which are all ones. For spreading a pilot symbol, or CSI-RS, a spreading sequence, or code, for the symbol is chosen from one of the MUBs, and in particular from a column of a MUB, for example, column 2 from MUB B. The particular column and the particular MUB used to spread a pilot symbol by a BS will be signaled by the BS to a receiving UE, or will be known by the UE based on some other value known to, or communicated to, the UE, such as a cell identifier (cell ID). It is preferable that when used for spreading, the average power of a particular OFDM subcarrier should be one, so the actual spreading code used will be a MUB multiplied by the square root of two.

In the case of D=4 (corresponding to a spreading by a factor of 4), a MUB set comprises five (5) MUBs (the maximum possible in this dimension) that may used to spread the pilot symbols and, in one example, includes bases A, B, C, and D (4-dimensional matrices), given as:

$$A = \left(\frac{1}{2}\right)\begin{bmatrix} 1 & 1 & 1 & 1 \\ 1 & 1 & -1 & -1 \\ 1 & -1 & -1 & 1 \\ 1 & -1 & 1 & -1 \end{bmatrix}, \quad B = \left(\frac{1}{2}\right)\begin{bmatrix} 1 & 1 & 1 & 1 \\ -1 & -1 & 1 & 1 \\ -i & i & i & -i \\ -i & i & -i & i \end{bmatrix},$$

$$C = \left(\frac{1}{2}\right)\begin{bmatrix} 1 & 1 & 1 & 1 \\ -i & -i & i & i \\ -i & i & i & -i \\ -1 & 1 & -1 & 1 \end{bmatrix}, \quad D = \left(\frac{1}{2}\right)\begin{bmatrix} 1 & 1 & 1 & 1 \\ i & i & -i & -i \\ 1 & -1 & -1 & 1 \\ -i & i & -i & i \end{bmatrix}$$

and the 4×4 identity matrix, I, which is a matrix of all zeros except for the diagonal elements which are all ones. For spreading a pilot symbol, or CSI-RS, a spreading sequence, or code, for the symbol is chosen from one of the MUBs, and in particular from a column of a MUB, for example, column 3 from MUB B. The particular column and the particular MUB used to spread a pilot symbol by a BS will be signaled by the BS to a receiving UE, or will be known by the UE based on some other value known to, or communicated to, the UE, such as a cell ID. Again, it is preferable that when used for spreading, the average power of a particular OFDM subcarrier should be one, so the actual code used will be two times these MUBs.

For the case of D=8, a MUB set comprises nine (9) MUBs that may be used to spread the pilot symbols, and one example of such MUBs includes bases A, B, C, D, E, F, G, H (8-dimensional matrices), given as:

$$A = \left(\frac{1}{\sqrt{8}}\right)\begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

$$B = \text{diag}\begin{pmatrix}\begin{bmatrix}1\\1\\-i\\i\\-1\\1\\-i\\-i\end{bmatrix}\end{pmatrix}A, \quad C = \text{diag}\begin{pmatrix}\begin{bmatrix}1\\i\\-1\\-i\\-1\\-i\\-1\\-i\end{bmatrix}\end{pmatrix}A, \quad D = \text{diag}\begin{pmatrix}\begin{bmatrix}1\\-i\\1\\i\\-i\\-1\\-i\\1\end{bmatrix}\end{pmatrix}A,$$

$$E = \text{diag}\begin{pmatrix}\begin{bmatrix}1\\1\\-1\\1\\-i\\-i\\-i\\i\end{bmatrix}\end{pmatrix}A \quad F = \text{diag}\begin{pmatrix}\begin{bmatrix}1\\-i\\-i\\-1\\i\\i\\-1\\-i\end{bmatrix}\end{pmatrix}A, \quad G = \text{diag}\begin{pmatrix}\begin{bmatrix}1\\-1\\-i\\i\\i\\i\\1\\1\end{bmatrix}\end{pmatrix}A,$$

$$H = \text{diag}\begin{pmatrix}\begin{bmatrix}1\\-i\\-i\\1\\1\\i\\-i\\-1\end{bmatrix}\end{pmatrix}A$$

and the D×D identity matrix, I. In the above equations, diag (b) is an 8×8 matrix of all zeros but with the elements of b on the diagonal. For spreading a pilot symbol, or CSI-RS, a spreading sequence, or code, for the symbol is chosen from one of the MUBs, and in particular from a column of a MUB, for example, column 3 from MUB A. The particular column and the particular MUB used to spread a pilot symbol by a BS will be signaled by the BS to a receiving UE, or will be known by the UE based on some other value known to, or communicated to, the UE, such as a cell ID. Again, it is preferable that when used for spreading, the average power of a particular OFDM subcarrier should be one, so the actual code used will be these MUBs multiplied by the square root of eight.

The advantages of spreading a pilot symbol with a code chosen from a MUBs is that the code will be guaranteed to have a low cross-correlation (in particular 1/D) with any code from another MUB. In particular if a first BS, such as BS 110, employs one MUB in a particular sector and a second BS, such as BS 120, employs a different MUB in a particular sector, then interference at the first BS from a UE sending feedback to the second BS will be at a low level due to a guaranteed distance between MUB sets. For example, for the spreading of D=4 case given above (which would correspond to four transmit antennas at the BSs), suppose the first BS in employs a sequence or code (i.e., column) from MUB 'M$^1$' in a sector served by the BS and the second BS employs a sequence or code (i.e., column) from MUB 'M$^2$' in an adjacent sector served by the second BS. The interference power from a transmission, by the second BS, of a pilot signal, or CSI-RS, spread by a sequence from MUB M$^2$ and received by a UE in the adjacent sector served by the first BS, will be suppressed by 1/D=¼ (or 6.0 dB) relative to the pilot signal transmitted by the first BS and spread by a sequence from MUB M$^1$.

The pilot signal, or CSI-RS, spreading employed by communication system 100 uses mutually-unbiased bases (MUBs) to give a guaranteed gain over interference from adjacent cells without the need of using FDM across PRBs, such as sending CSI-RS on every third PRB in frequency as is depicted in FIGS. 5 and 6. In addition to having all of the optimal pilot signal design properties described above, the MUB-based spreading scheme employed by communication system 100 has the following properties: (1) the CSI-RS is spaced every 12$^{th}$ subcarrier across frequency, thus allowing per-subcarrier channel estimates to be found (maximum delay is estimated to be 5.55 μec), (2) the use of the MUBs to spread a pilot signal adds a 6 dB gain to the pilot signal over pilot signals transmitted by an interfering sector or cell, and (3) by using sequences (across frequency) with good cross-correlation properties, an additional gain over interference is possible beyond what the MUBs give.

Unlike the CSI-RS format described with respect to FIGS. 5 and 6, in communication system 100, each BS antenna 1312 sends pilot signals on a different group of REs, and all cells transmit pilots for the same antenna on the same set of REs with either the same MUB (but with a different spreading sequence, that is, a different column of the MUB, than the first cell) or a different MUB altogether (up to what the CSI-RS reuse can allow). The reason this is done is because the 6 dB of interference suppression provided by using a MUB is gained only if one sequence from a MUB is used for spreading. Hence if the desired pilot signal and the interfering pilot signals used all four sequences from a 4×4 MUB, there would be no gain over interference (assuming that only one dominant interfering cell is likely on the group of REs for a single antenna). It should be noted that the other BSs do not necessarily have to send pilot signals for the same antenna as the first BS, but could send pilot signals for a different antenna. However the pilot signals for the antenna on the second BS must overlap with the pilot signals for the antenna on the first BS.

Referring now to FIGS. 7-10, MUB-based pilot signal spreading schemes employed by communication system 100, and in particular by BSs, such as BSs 110 and 120, of the communication system to spread a pilot signal and by UEs, such as UE 102 and 103, to despread a received pilot signal, are depicted in accordance with various embodiments of the present invention. In order to illustrate the principles of the present invention and not intending to limit the invention, the pilot signal spreading illustrated in FIGS. 7-10 is done with MUBs from four dimensions chosen from the following MUB set:

$$M^1 = \begin{bmatrix}1 & 1 & 1 & 1\\1 & 1 & -1 & -1\\1 & -1 & -1 & 1\\1 & -1 & 1 & -1\end{bmatrix}, \quad M^2 = \begin{bmatrix}1 & 1 & 1 & 1\\-1 & -1 & 1 & 1\\-i & i & i & -i\\-i & i & -i & i\end{bmatrix},$$

$$M^3 = \begin{bmatrix}1 & 1 & 1 & 1\\-i & -i & i & i\\-i & i & i & -i\\-1 & 1 & -1 & 1\end{bmatrix}, \quad M^4 = \begin{bmatrix}1 & 1 & 1 & 1\\i & i & -i & -i\\1 & -1 & -1 & 1\\-i & i & -i & i\end{bmatrix},$$

$$M^5 = \begin{bmatrix}4 & 0 & 0 & 0\\0 & 4 & 0 & 0\\0 & 0 & 4 & 0\\0 & 0 & 0 & 4\end{bmatrix}$$

The MUBs for four dimensions have the property that spreading sequences, that is, the different columns (i.e., sequences or codes) within a MUB, M$^l$, are orthogonal, and between MUBs have a signal to interference ratio of 6 dB.

Thus interfering cells are guaranteed to have at least 6 dB of gain (assuming that only one dominant interferer is present).

Figures 7, 8:
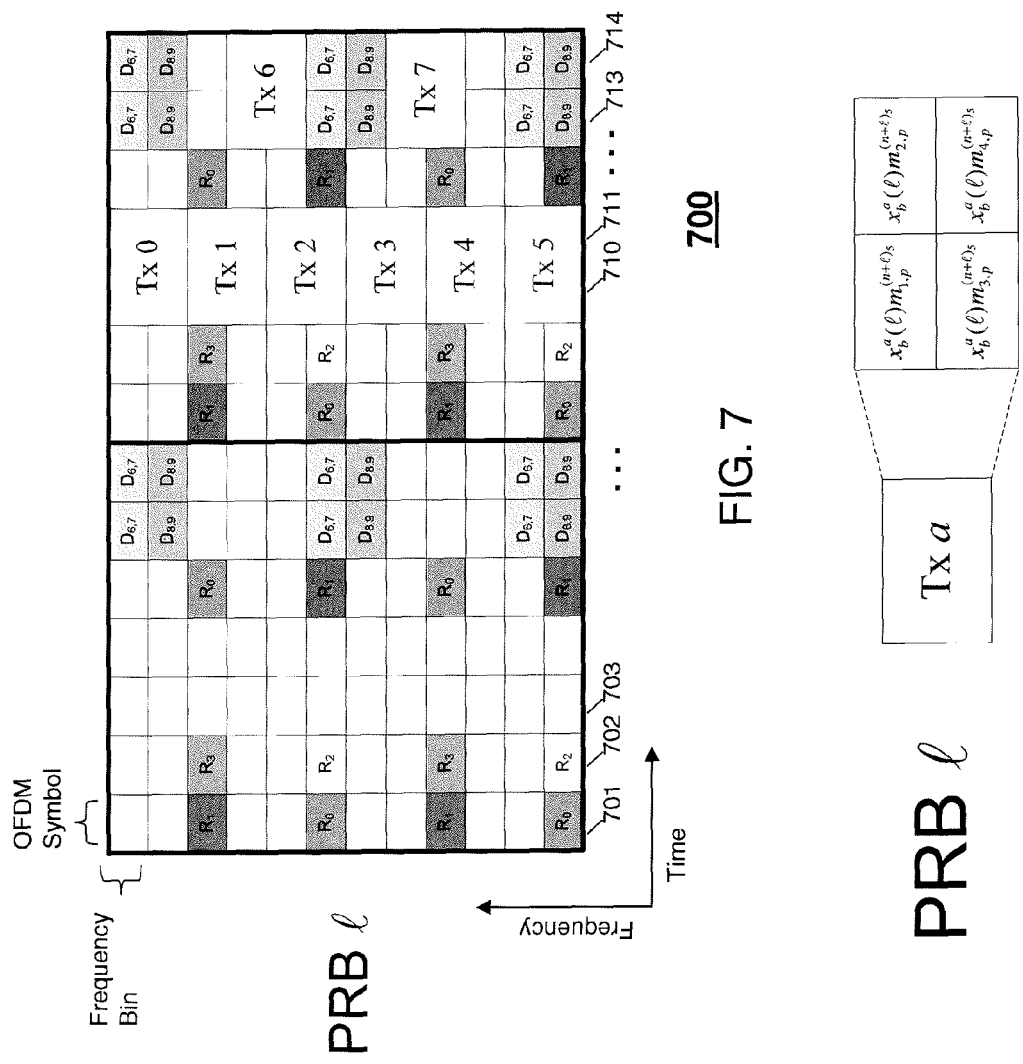
FIG. 7 is a time-frequency diagram of an OFDMA frequency bandwidth employed by the communication system of FIG. 1 and that illustrates pilot signal placement within the OFDMA frequency bandwidth in accordance with another embodiment of the present invention.
FIG. 8 is a block diagram depicting a placement of a pilot signal associated with a transmit antenna in the OFDMA frequency bandwidth of FIGS. 7 and 9 in accordance with an embodiment of the present invention.

Referring now to FIGS. 7 and 8, an exemplary CSI-RS format employed by communication system 100 is depicted in accordance with another embodiment of the present invention. FIG. 7 is an exemplary time-frequency diagram 700 of an OFDMA frequency bandwidth employed by communication system 100 in accordance with another embodiment of the present invention. A vertical scale of time-frequency diagram 700 depicts multiple blocks of frequency, or frequency bins, (frequency subcarriers) of the frequency bandwidth. A horizontal scale of time-frequency diagram 700 depicts multiple blocks of time (in units of OFDM symbols) 701-714. Time-frequency diagram 700 depicts a single PRB, that is, PRB 1, that comprises 12 OFDM subcarriers over 14 OFDM symbols. Thus, in the embodiment of communication system 100 depicted in FIG. 7, the PRB may be considered to singularly repeat. It should be noted that the PRB with CSI-RS does not necessarily need to singularly repeat and a PRB with CSI-RS may only be present every two or more PRBs or can even be randomly distributed across PRBs in frequency.

The pilot signals, or CSI-RSs, reside in the Resource Elements (REs) of OFDM symbols 710 and 711 and OFDM symbols 713 and 714, and up to four (4) different sectors or cells can be orthogonally received at a UE and up to sixteen (16) different sectors or cells can be quasi-orthogonally received at a UE. Referring now to FIG. 8, a same transmit antenna at each of up to four interfering sectors or cells, for example, an antenna 'a' at each of BS 110 and BS 120, then may transmit a CSI-RS in a 2×2 block of REs, also referred to as a tile, allocated for transmission of an CSI-RS. For example, as depicted in FIG. 8, a 2×2 RE block (or tile) of a PRB 1 that is allocated for pilot signal transmission includes a first spread CSI-RS sequence $x_a^b(1) m_{1,p}^{(n+l)5}$, a second spread CSI-RS sequence $x_a^b(1) m_{2,p}^{(n+l)5}$, a third spread CSI-RS sequence $x_a^b(1) m_{2,p}^{(n+l)5}$, and a fourth spread CSI-RS sequence $x_a^b(1) m_{2,p}^{(n+l)5}$, where $x_a^b(1)$ is a frequency-domain scrambling sequence (e.g., a Zadoff-Chu sequence or other suitable sequence) for antenna a and cell b and $m_{n,p}^l$ is an element (n,p) from a MUB 'l', where the MUB 'l' is a 4×4 matrix as described above. These four spread CSI-RS sequences is the actual pilot signal transmission from the BS. In a four dimensional space, there are five MUBs available, so each antenna a at one of the potential four BSs sharing a 2×2 RE block may use a column from a separate MUB to spreads its CSI-RS or may even use a different column from the same MUB or could also use the same column from the same MUB. The shaded REs having an 'R' or a 'D' included in the RE are REs reserved for a common pilot (R) or a dedicated pilot (D) signal and represent pilot signals that are not useful in determining CSI. As eight 2×2 RE blocks (or tiles) have been allocated in the frequency bandwidth depicted in time-frequency diagram 700, this scheme supports up to eight transmit antennas at each of multiple interfering BSs, where a same antenna at each of up to four interfering BSs may transmit a CSI-RS in a same 2×2 block of REs. However, as should be apparent, if a MUB set comprising nine (9) MUBs is used, then the frequency bandwidth depicted in time-frequency diagram 700 could supports up to eight transmit antennas at each of multiple interfering BSs wherein a same antenna at each of up to eight or nine interfering BSs may transmit a CSI-RS in a same 2×2 block of REs.

The frequency-domain scrambling sequences $x_a^b(1)$ have good cross-correlation properties, which can be used to decrease the interference further from what the MUBs deliver by using channel estimation techniques (e.g., by multiplying by the conjugate of the frequency-domain scrambling sequence and taking an IFFT and filtering in the time-domain).

Figure 9:
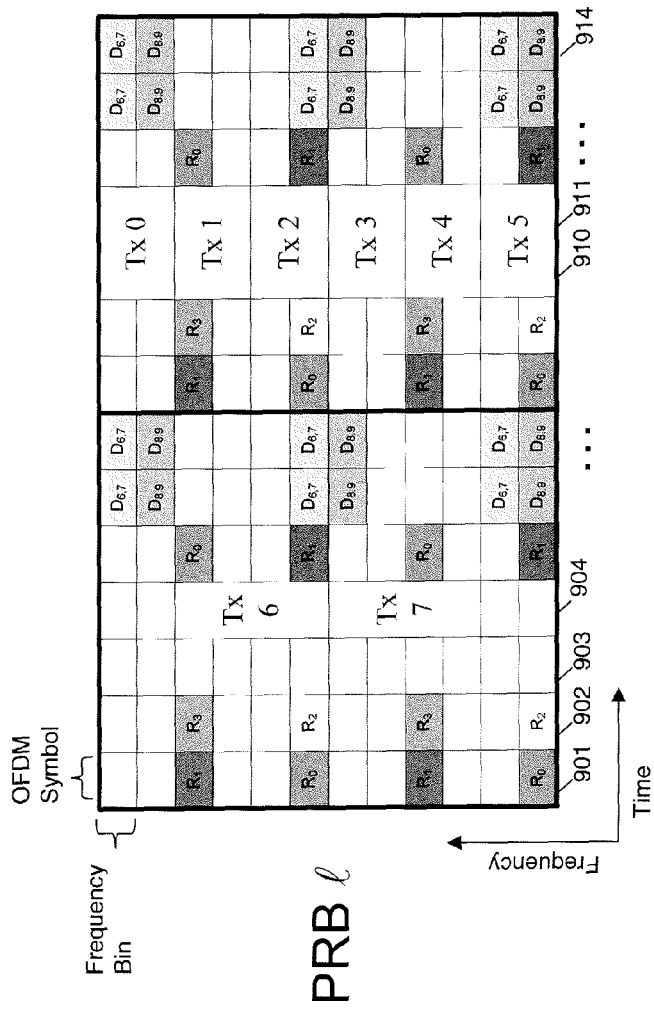
FIG. 9 is a time-frequency diagram of an OFDMA frequency bandwidth employed by the communication system of FIG. 1 and that illustrates pilot signal placement within the OFDMA frequency bandwidth in accordance with another embodiment of the present invention.
Figure 10:
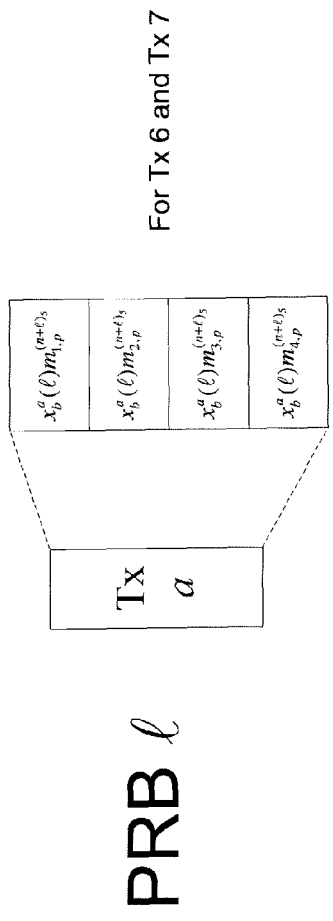
FIG. 10 is a block diagram depicting a placement of a pilot signal associated with a transmit antenna in the OFDMA frequency bandwidth of FIG. 9 in accordance with another embodiment of the present invention.

Referring now to FIGS. 9 and 10, an exemplary CSI-RS format employed by communication system 100 is depicted in accordance with another embodiment of the present invention. Similar to FIG. 7, FIG. 9 is an exemplary time-frequency diagram 900 of an OFDMA frequency bandwidth employed by communication system 100 in accordance with another embodiment of the present invention, in which a vertical scale of the time-frequency diagram depicts multiple blocks of frequency, or frequency bins, (frequency subcarriers) of the frequency bandwidth and a horizontal scale of time-frequency diagram 900 depicts multiple blocks of time (in units of OFDM symbols) 901-914. Also, similar to time-frequency diagram 700, time-frequency diagram 900 depicts a single PRB, that is, PRB 1, that comprises 12 OFDM subcarriers over 14 OFDM symbols. Thus, in the embodiment of communication system 100 depicted in FIG. 7, the PRB may be considered to singularly repeat. It should be noted that the PRB with CSI-RS does not necessarily need to singularly repeat and a PRB with CSI-RS may only be present every two or more PRBs or can even be randomly distributed across PRBs in frequency.

The pilot signals, or CSI-RSs, reside in the Resource Elements (REs) of OFDM symbols 910 and 911 and OFDM symbol 904, and similar to time-frequency diagram 700 up to four (4) different sectors or cells can be orthogonally received at a UE and up to sixteen (16) different sectors or cells can be quasi-orthogonally received at a UE. The 2×2 blocks of REs allocated to transmit antennas 0-5, that is, Tx 0-Tx 5, for transmission of pilot signals may be allocated to a same antenna at each of four BSs orthogonally and up to sixteen BSs quasi-orthogonally and include spread CSI-RSs as illustrated in FIG. 8. However, antennas 6 and 7 (Tx 6 and Tx 7) are each allocated a 1×4 block of REs and may be allocated to a same antenna at each of four BSs orthogonally and up to sixteen BSs quasi-orthogonally and include spread CSI-RSs as illustrated in FIG. 9. For example, as depicted in FIG. 9, a 1×4 block of REs of a PRB 1 that is allocated for pilot signal transmission includes a first spread CSI-RS sequence $x_a^b(1) m_{1,p}^{(n+l)5}$, a second spread CSI-RS sequence $x_a^b(1) m_{2,p}^{(n+l)5}$, a third spread CSI-RS sequence $x_a^b(1) m_{2,p}^{(n+l)5}$, and a fourth spread CSI-RS sequence $x_a^b(1) m_{2,p}^{(n+l)5}$, where $x_a^b(1)$ is a frequency-domain scrambling sequence (e.g., a Zadoff-Chu sequence or other suitable sequence) for antenna a and cell b and $m_{n,p}^l$ is an element (n,p) from a MUB 'l', where the MUB 'l' is a 4×4 matrix as described above. These spread CSI-RS are the pilot signals transmitted from a BS. Again, the shaded REs having an 'R' or a 'D' included in the RE are REs reserved for a common pilot (R) or a dedicated pilot (D) signals which are not useful for CSI estimation. As eight blocks of four REs each have been allocated in the frequency bandwidth depicted in time-frequency diagram 900, this scheme, too, supports up to eight transmit antennas at each of multiple interfering BSs, where a same antenna at each of up to four interfering BSs may transmit a CSI-RS in a same allocated block of REs. However, as should be apparent, if a MUB set comprising nine (9) MUBs is used, then the frequency bandwidth depicted in time-frequency diagram 900 could supports up to eight transmit antennas at each of multiple interfering BSs wherein a same antenna at each of up to eight or nine interfering BSs may transmit a CSI-RS in a same block of REs.

Figure 11:
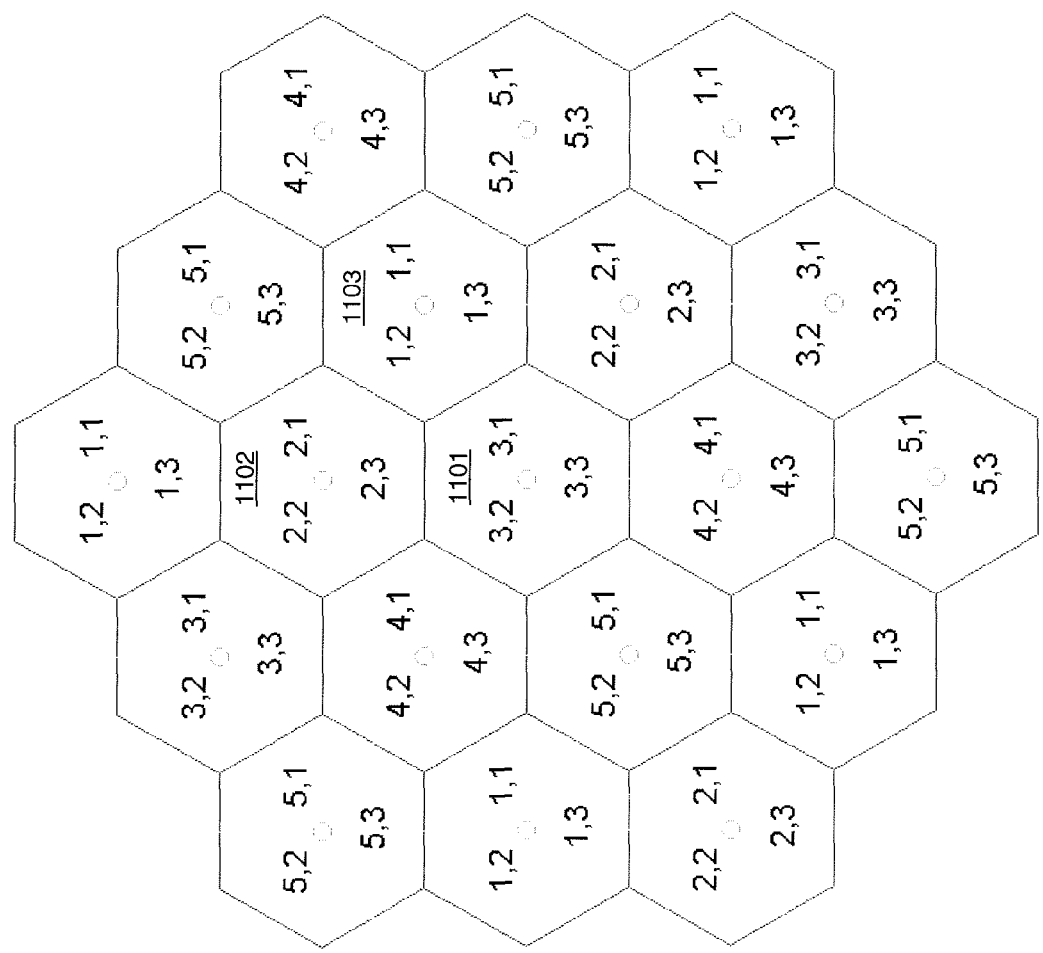
FIG. 11 is another block diagram depicting an exemplary cellular reuse plan employed by the wireless communication system of FIG. 1 in accordance with an embodiment of the present invention.

An exemplary cellular CSI-RS reuse for MUB-based CSI-RSs that may employ the CSI-RS format depicted in FIGS. 7-10 is shown in FIG. 11. Similar to the cellular reuse plan depicted in FIG. 6, in the cellular reuse plan depicted in FIG. 11 a coverage area of communication system 100 is divided into multiple cells, or BS coverage areas, that are each provided wireless service by a BS, such as BSs 110 and 120. Each cell is, in turn, divided into three sectors. FIG. 11 also depicts, for each sector, a MUB, and a column of the MUB, allocated to that sector for spreading a CSI-RS. For example, for cell 1101, a first sector (the northeast sector) is allocated a first column of a third MUB (3,1) in a MUB set comprising five (5) MUBs, a second sector (the northwest sector) is allocated a second column of the third MUB (3,2), and a third sector (the south sector) is allocated a third column of the third MUB (3,3). For cell 1102, a first sector is allocated a first column of a second MUB (2,1) in the MUB set, a second sector is allocated a second column of the second MUB (2,2), and a third sector is allocated a third column of the second MUB (2,3). And for cell 1103, a first sector is allocated a first column of a first MUB (1,1) in the MUB set, a second sector is allocated a second column of the first MUB (1,2), and a third sector is allocated a third column of the first MUB (1,3). This pattern of reuse keeps sectors, that is, CSI-RSs transmitted in those sectors, within a same BS orthogonal to each other and limits interference with CSI-RSs used by other, neighboring BSs by having the neighboring BSs use different MUBs (i.e., in the CSI-RS formats of FIGS. 7-10, interference from a single sector in a neighboring base will be received 6 dB lower after despreading the appropriate MUB at the UE). In a further embodiment of the present invention as depicted in FIGS. 7-11, each cell/BS may apply a different sequence in frequency to the CSI-RS for further interference mitigation and still retain the orthogonality within a MUB and the 6 dB gains over interference between MUBs. The use of an appropriately designed frequency-domain spreading sequence (e.g., a Zadoff-Chu sequence as known in the art) may provide additional gains above interference over the 6 dB that the MUB spreading gives.

Note that it is possible to extend the first CSI-RS format (shown in FIG. 5) to utilize some benefits of MUB-based design. The four CDM sequences corresponding to four antennas (from a single eNB) used in FIG. 5 may be selected from an orthogonal basis of MUBs. The cells containing overlapping CSI-RS on the same resource (beyond the reuse factor) may use a different orthogonal basis from the same set of MUBs providing a 6 dB interference suppression. This provides an improved performance with some additional cell planning.

The above CSI-RS formats depicted in FIGS. 7-10 assume the normal macro-cellular deployment of eNodeBs and typical sectorization. However, future deployments may be heterogeneous, meaning that mixed in with the macro-cell deployment may be low power nodes like relays, pico-cells, and femto-cells operating on the same carriers as the macro-cell depicted in FIG. 11. With these configurations, a need for CSI-RS from many different cells might reduced depending on how the heterogeneous network is configured. For example, consider a case where one carrier is transmitted with low power from the macro-cell BS and is reused by a pico-cell or femto-cell at normal power. In this case there would be no interference from the macro-cell and the pico-cell or femto-cell would only need CSI-RS for its own set of antennas. In this case, the CSI-RS formats presented above would only need the CSI-RS for one cell and the remaining CSI-RS positions can be filled with data. In such a case, a UE reporting CSI to the pico-cell or femto-cell would only calculate and report CSI for the serving pico-cell or femto-cell.

By way of another example, a pico-cell or femto-cell may reuse the same carrier which the macro-cell is using at full power. In such an event, the pico-cell or femto-cell may desire coordination from the macro-cell to reduce the interference from the macro-cell. Therefore, it would be preferable to have CSI-RS for two cells, the macro-cell and the pico-cell or femto-cell. In one such instance, the macro-cell would already be transmitting CSI-RS on its assigned resources and the pico-cell or femto-cell is free to choose one of the other CSI-RS resources. In another such instance, the pico-cell or femto-cell may be limited to a set of CSI-RSs that are unlikely to be used in CoMP so as not to interfere with CoMP CSI calculations by other UEs in the macro-cell. For example, if the pico-cell or femto-cell is in sector 1 (the northeast cell) of the middle cell in FIG. 6, then the pico-cell or femto-cell might be restricted to CSI-RS numbers 4 and 7 which would not be used for CoMP operation. In this case, a UE reporting CSI to the pico-cell or femto-cell would report CSI for the pico-cell or femto-cell plus the CSI for the macro-cell base. It might be possible for the pico-cell or femto-cell to transmit data on the resource elements where the other CSI-RS is located.

By way of yet another example, a pico-cell or femto-cell might be located near an edge of a cell and, therefore, would like to have CoMP interference reductions from more than just the serving cell. In this case, the pico-cell or femto-cell may use a CSI-RS that normally is not reported on by the cell (e.g., for sector 1 of middle cell 601 in FIG. 6, the pico-cell or femto-cell could use either CSI-RS numbers 4 or 7). The UE would then calculate CSI-RS for all possible cells and report back the strongest (including the serving pico-cell or femto-cell) to the serving pico-cell or femto-cell.

By way of still another example, a hybrid case could also be possible where the pico-cell or femto-cell senses the strongest interfering macro-cells and has the UE only report back the CSI for those strong macro-cells in addition to the CSI for the serving pico-cell or femto-cell. It may be possible, in this case, for the pico-cell and femto-cell to transmit data on the resource elements where the CSI-RS of non-interfering cells is located.

Still another scenario for heterogeneous network deployments is where the pico, femto and relay nodes are in a different carrier frequency than the macro cell node. Since the heterogeneous nodes will be deployed in a random location it is simpler to avoid any system planning with respect to CSI reuse patterns. Since these are low power nodes, they can transmit random CSI patterns since the interference between the heterogeneous nodes will be negligible.

Figure 14:
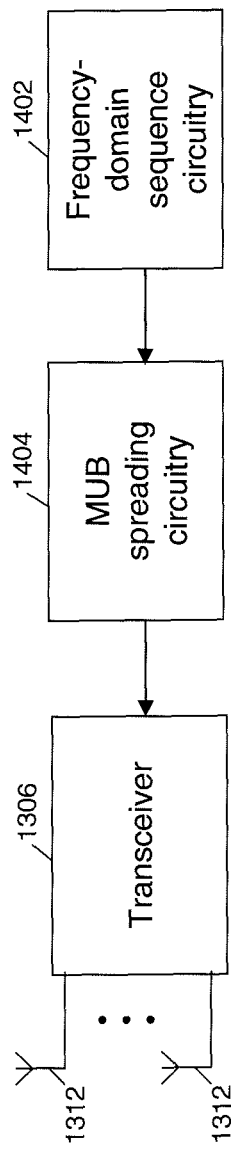
FIG. 14 is block diagram illustration of an architecture of a base station of FIG. 1 in accordance with an embodiment of the present invention.

Referring now to FIGS. 14 and 16, a method of pilot signal transmission by BS 1300, such as BSs 110 and 120, is depicted in accordance with an embodiment of the present invention. More particularly, FIG. 14 is a block diagram of an architecture of BS 1300 in accordance with an embodiment of the present invention and FIG. 16 is a logic flow diagram 1600 of a method executed by BS 1300 in transmitting a pilot signal in accordance with an embodiment of the present invention. Logic flow diagram 1600 begins when pilot sequences are assigned to each BS, such as BSs 110 and 120, of multiple BSs in communication system 100. When a BS determines (1602) that it is time to transmit the pilot sequences, frequency-domain sequence circuitry 1402 of the BS determines (1604) which frequency-domain scrambling sequence to apply to a pilot signal for each transmit antenna (e.g., based on a cell identifier (ID)), and computes a frequency-domain scrambling sequence for each transmit antenna 1312 on each frequency (or PRB) that contains pilot symbols.

Frequency-domain sequence circuitry 1402 then routes the frequency-domain scrambling sequences for each transmit antenna to the MUB spreading circuitry 1404, which determines (1606) which MUB, and in particular an appropriate column of the MUB, to use for each antenna on each PRB and spreads (1608) the frequency-domain scrambling sequence for each antenna using the appropriate MUB to produce spread pilot signals, that is, the CSI-RS, for each transmit antenna 1312. MUB spreading circuitry 1404 then routes the pilot signals for each transmit antenna 1312 to transceiver circuitry 1306 for transmission (1610) via the appropriate transmit antennas, and logic flow 1600 then ends. Preferably, frequency-domain sequence circuitry 1402 and MUB spreading circuitry 1404 are each implemented by signal processing unit 1302 of BS 1300 based on software maintained by the at least one memory device 1304 of the BS, although in other embodiments of the present invention one or more of the frequency-domain sequence circuitry and the MUB spreading circuitry may be implemented in hardware, for example, integrated circuits (ICs), application specific integrated circuits (ASICs), and the like.

Further, and referring to FIGS. 11 and 16, when a cell serviced by a BS, such as BSs 110 and 120, is divided into multiple sectors, such as a first sector, a second sector, and a third sector, determining which MUB, and in particular an appropriate column of the MUB, to use for transmission of a pilot signal via each antenna on each PRB includes selecting a first sequence, or first column, from the MUB to use to spread a pilot signal for transmission via a first antenna of the multiple antennas at the BS serving the first sector of the multiple sectors, determining a second sequence, that is, a second column, from the MUB to use to spread another pilot signal for transmission via a second antenna of the multiple antennas associated with the second sector of the multiple sectors, and determining a third sequence, that is, a third column, from the MUB to use to spread yet another pilot signal for transmission via a third antenna of the multiple antennas associated with the third sector of the multiple sectors, and spreading the pilot signals using the determined sequences to produce spread pilot signals for transmission via the corresponding antennas in the corresponding sectors.

Additionally, and again referring to FIGS. 11 and 16, an antenna at each of multiple adjacent BSs, such as BSs serving cells 1101, 1102, and 1103, may transmit a pilot signal, for example, over a same reference element of an orthogonal frequency division multiplexing bandwidth, that may interfere with the pilot signals transmitted by the other BSs of the multiple BSs. In such an embodiment, determining which MUB, and in particular an appropriate column of the MUB, to use for transmission of a pilot signal via an antenna on each PRB comprises each BS determining, in association with the antenna at the BS, a sequence, that is, a column, from a MUB to use to spread a pilot signal for transmission by the BS's antenna, wherein the MUB considered by each such BS for determination of a sequence to use to spread a pilot for transmission by the BS via the antenna at the BS is different from the MUB considered by the other BS of the multiple BSs for determination of a sequence to use to spread a pilot for transmission by the BS. That is, a first BS, serving cell 1101, will consider a first MUB in determining a first sequence, that is, a column of the first MUB, to use to spread a pilot signal for transmission by the first BS's antenna, a second BS, serving cell 1102, will consider a second, different MUB in determining a second sequence, that is, a column of the second MUB, to use to spread a pilot signal for transmission by the second BS's antenna, and a third BS, serving cell 1103, will consider a third MUB, different from the first and second MUBs, in determining a third sequence, that is, a column of the third MUB, to use to spread a pilot signal for transmission by the third BS's antenna. Spreading the pilot signals then comprises, for each such BS/antenna, spreading the pilot signal to be transmitted over the antenna using the sequence determined in association with the BS and antenna.

Figure 15:
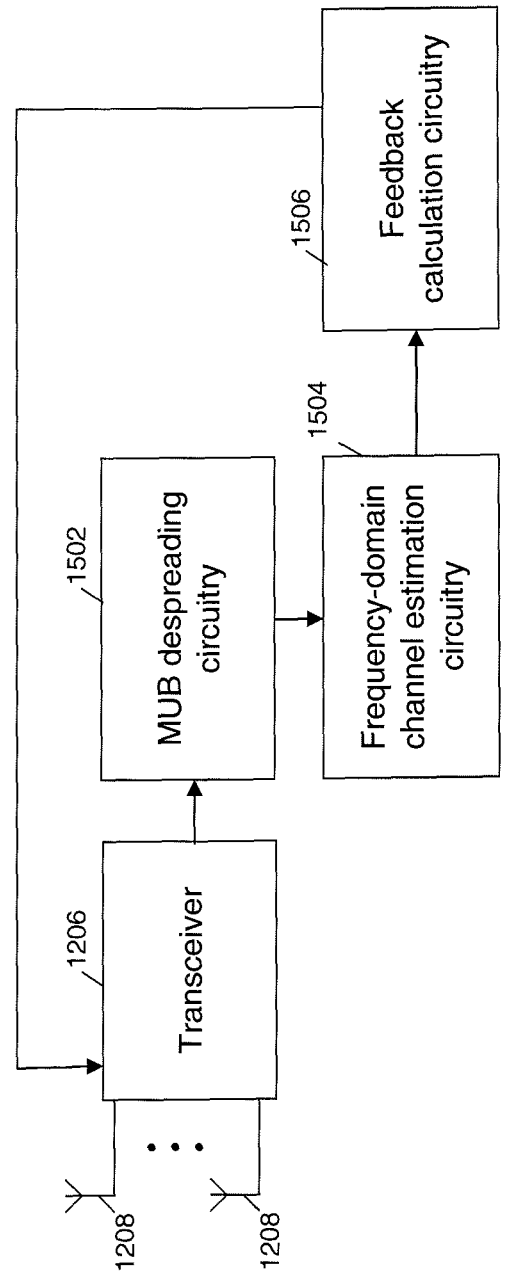
FIG. 15 is block diagram illustration of an architecture of a user equipment of FIG. 1 in accordance with an embodiment of the present invention.

Referring now to FIGS. 15 and 17, a method of receiving and processing a pilot signal by UE 1200, such as UEs 102 and 103, is depicted in accordance with an embodiment of the present invention. More particularly, FIG. 15 is a block diagram of UE 1200 in accordance with an embodiment of the present invention and FIG. 17 is a logic flow diagram 1700 of a method executed by UE 1200 in receiving and processing a pilot signal in accordance with an embodiment of the present invention. Logic flow diagram 1700 begins when the UE receives (1702), at each receive antenna 1208, a pilot signal transmission from each transmit antenna 1312 of the transmitting BS. As described above, each received pilot signal comprises a MUB-spread frequency-domain pilot signal. The received pilot signals are processed by the transceiver circuitry 1206 and are routed to MUB despreading circuitry 1502. For each received pilot signal, MUB despreading circuitry 1502 determines (1704), based on a knowledge of the MUBs used by the transmitting BS for each PRB, a MUB-based spreading sequence, such as a column of a MUB, used to spread the pilot signal and despreads (1706) the pilot signal transmission received at each antenna 1208 using the determined MUB. MUB despreading circuitry 1502 then routes the despread pilot signal transmission to frequency-domain channel estimation circuitry 1504.

Frequency-domain channel estimation circuitry 1504 computes (1708) frequency-domain channel estimates, such as a frequency response, in association with the channel between each transmit antenna 1312 at the transmitting BS and each receive antenna 1208 at the receiving UE based on the despread pilot signal and in accordance with well-known techniques in the art, and in particular based on the received versions of the frequency-domain sequences used by the transmitting BS, which received versions of the frequency-domain sequences indicate a condition of the air interface, that is, the physical channel, via which the pilot signal has been received. Frequency-domain channel estimation circuitry 1504 then routes the frequency-domain channel estimates to feedback calculation circuitry 1506, which computes (1710) CSI based on the frequency-domain channel estimates. The UE then transmits (1712) an indication of a condition of an intervening channel, preferably providing CSI feedback, back to a selected BS (which may or may not be the same as the transmitting BS) using transceiver 1206, and logic flow diagram 1700 then ends. Preferably, MUB despreading circuitry 1502, frequency-domain channel estimation circuitry 1504, and feedback calculation circuitry 1506 are each implemented by signal processing unit 1202 of UE 1200 based on software maintained by the at least one memory device 1204 of the UE, although in other embodiments of the present invention one or more of the MUB despreading circuitry, the frequency-domain channel estimation circuitry, and the feedback calculation circuitry may be implemented in hardware, for example, integrated circuits (ICs), application specific integrated circuits (ASICs), and the like.

Further, and referring to FIGS. 11 and 17, when the UE resides in a cell serviced by a BS, that is divided into multiple sectors, such as a first sector, a second sector, and a third sector, receiving, by the UE, a pilot signal at each antenna of the UE may comprise receiving multiple pilot signals from the multiple sectors associated with, that is, serviced by, the BS. In such an event, determining, by the UE, a MUB-based spreading sequence, that is, a column of the MUB, used to spread a pilot signal comprises, for each pilot signal of the multiple received pilot signals, determining a sequence from the MUB, wherein the sequence, or MUB column, determined for each pilot signal of the multiple received pilot signals is different from the sequence, or MUB column, determined for another pilot signal of the multiple received pilot signals, and wherein despreading comprises despreading each pilot signal of the multiple received pilot signals using the sequence determined for the pilot signal. For example, a first column of the MUB may be used to despread the pilot signal associated with the first sector, a second column of the MUB may be used to despread the pilot signal associated with the second sector, and a third column of the MUB may be used to despread the pilot signal associated with the third sector.

Additionally, and again referring to FIGS. 11 and 16, an antenna at each of multiple adjacent BSs, such as BSs serving cells 1101, 1102, and 1103, may transmit a pilot signal, for example, over a same reference element of an orthogonal frequency division multiplexing bandwidth, that may interfere with the pilot signals transmitted by the other BSs of the multiple BSs and received by the UE. In such an embodiment, determining a MUB, and in particular an appropriate column of the MUB, to use to despread a received pilot signal may comprise, for each pilot signal of the multiple received pilot signals (wherein each pilot signal is received from a different BS), determining a sequence, that is, a column, from a MUB, wherein a MUB used to determine a sequence for a pilot signal of the multiple pilot signals is different from the MUBs used to determine a sequence for the other pilot signals of the multiple pilot signals. Despreading then comprises despreading each received pilot signal of the multiple received pilot signals using the sequence determined for the pilot signal. The UE then may determine, or compute, based on the despread pilot signal, CSIs associated with each BS of the multiple BSs and transmit indications of the determined/computed CSIs back to a particular BS, such as a serving BS.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. The terms "including" and/or "having," as used herein, are defined as comprising. The term "coupled," as used herein, is defined as connected, although not necessarily directly, and not necessarily mechanically. An element preceded by " . . . a" does not, without more constraints, preclude the existence of additional identical elements in the process, method, article, or apparatus that the element. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for pilot signal processing in a wireless communication system, the method comprising:
   determining a sequence from a plurality of mutually unbiased bases (MUBs) to use to spread a pilot signal for transmission via an antenna of a plurality of antennas, wherein each of the plurality of antennas sends pilot signals on a different group of resource elements (REs) of an Orthogonal Frequency Division Multiplexing symbol using sequences from different mutually unbiased bases of the plurality of mutually unbiased bases; and
   spreading the pilot signal using the determined sequence to produce a spread pilot signal.

2. The method of claim 1, further comprising determining a frequency domain sequence to apply to the pilot signal and sending pilot signals on the different groups of REs wherein all cells transmit pilot signals for the same antenna on the same set of REs with either a different spreading sequence from the same MUB than a first cell or from different MUBs from the plurality of MUBs.

3. The method of claim 1, wherein the plurality of antennas reside in an antenna array at a same base station and wherein the method further comprises transmitting the spread pilot signal via a single antenna of the plurality of antennas.

4. The method of claim 1, wherein the plurality of mutually unbiased bases are elements of a multi-dimensional matrix and wherein determining a sequence from a plurality of mutually unbiased bases to use to spread a pilot signal comprises selecting a column of the matrix and determining the sequence from the selected column.

5. The method of claim 1, wherein a base station serves a coverage area that is divided into a plurality of sectors, wherein determining comprises determining a first sequence from the plurality of mutually unbiased bases to use to spread a pilot signal for transmission via a first antenna of the plurality of antennas that is associated with a first sector of the plurality of sectors, and wherein the method further comprises:
   determining a second sequence from the plurality of mutually unbiased bases to use to spread another pilot signal for transmission via a second antenna of the plurality of antennas and that is associated with a second sector of the plurality of sectors; and
   spreading the another pilot signal using the determined second sequence to produce a spread pilot signal for transmission in the second sector.

6. The method of claim 5, wherein the plurality of mutually unbiased bases are elements of a multi-dimensional matrix, wherein the determined first sequence for spreading the pilot signal for transmission in the first sector comprises a column of the matrix, and wherein the determined second sequence for spreading the pilot signal for transmission in the second sector comprises a different column of the matrix.

7. The method of claim 1, wherein an antenna at each of multiple adjacent base stations transmits over a same reference element of an orthogonal frequency division multiplexing bandwidth, wherein determining comprises, in association with the antenna each base station of the plurality of base stations, determining a sequence from a plurality of mutually unbiased bases to use to spread a pilot signal for transmission by the antenna, wherein the plurality of mutually biased bases considered for determination of a sequence in association with each such antenna is different from the plurality of mutually biased bases considered for determination of a sequence in association with the other antennas of such antennas, and wherein spreading comprises, for each such antenna, spreading the pilot signal to be transmitted over the antenna using the sequence determined in association with the antenna.

8. A method for pilot signal processing in a wireless communication system, the method comprising:
   receiving a pilot signal on a plurality of antennas via an air interface;
   determining a sequence from a plurality of mutually unbiased bases to use to despread the received pilot signal, wherein each of the plurality of antennas receives pilot signals on a different group of resource elements of an Orthogonal Frequency Division Multiplexing symbol using sequences from different mutually unbiased bases of the plurality of mutually unbiased bases; and
   despreading the pilot signal using the determined sequence to produce a despread pilot signal.

9. The method of claim 8, further comprising:
   determining a condition of a channel based on the despread pilot signal; and
   transmitting an indication of the determined condition of the channel to a base station.

10. The method of claim 8, wherein receiving a pilot signal comprises receiving a pilot signal each sector of a plurality of sectors associated with a base station to produce a plurality of received pilot signals, wherein determining comprises, for each pilot signal of the plurality of pilot signals, determining a sequence from the plurality of mutually unbiased bases, wherein the sequence determined for each pilot signal of the plurality of pilot signals is different from the sequence determined for the other pilot signals of the plurality of pilot signals, and wherein despreading comprises despreading each pilot signal of the plurality of pilot signals using the sequence determined for the pilot signal.

11. The method of claim 10, wherein the plurality of mutually unbiased bases comprise a multi-dimensional matrix and wherein each determined sequence comprises a column of the matrix.

12. The method of claim 8, wherein receiving a pilot signal comprises receiving a pilot signal from each base station of a plurality of base stations to produce a plurality of received pilot signals, wherein determining comprises, for each pilot signal of the plurality of pilot signals, determining a sequence from a plurality of mutually unbiased bases, wherein the plurality of mutually unbiased bases used to determine a sequence for a pilot signal of the plurality of pilot signals is different from the plurality of mutually unbiased bases used to determine a sequence for another pilot signal of the plurality of pilot signals, and wherein despreading comprises despreading each pilot signal of the plurality of pilot signals using the sequence determined for the pilot signal.

13. The method of claim 12, wherein each plurality of mutually unbiased bases used to determine a sequence for a pilot signal comprises a multi-dimensional matrix and wherein each matrix used to determine a sequence for a pilot signal of the plurality of pilot sequences is different from the matrix used to determine a sequence for a different pilot signal of the plurality of pilot sequences.

14. A base station capable of pilot signal processing in a wireless communication system, the base station comprising:
   a plurality of antennas; and
   mutually unbiased bases circuitry that is configured to determine a sequence from a plurality of mutually unbiased bases to use to spread a pilot signal for transmission via an antenna of the plurality of antennas, wherein each of the plurality of antennas sends pilot signals on a different group of resource elements of an Orthogonal Frequency Division Multiplexing symbol using sequences from different mutually unbiased bases of the plurality of mutually unbiased bases, and spread the pilot signal using the determined sequence to produce a spread pilot signal.

15. The base station of claim 14, further comprising frequency-domain sequence circuitry that determines a frequency domain sequence to apply to the pilot signal.

16. The base station of claim 14, wherein the base station further comprises transmitting circuitry that transmits the spread pilot signal via a single antenna of the plurality of antennas.

17. The base station of claim 14, wherein the plurality of mutually unbiased bases are elements of a multi-dimensional matrix and wherein the determined sequence is selected from a column of the matrix.

18. The base station of claim 17, wherein the base station serves a coverage area that is divided into a plurality of sectors, wherein the mutually unbiased bases circuitry is configured to determine a sequence from a plurality of mutually unbiased bases by determining a first sequence from the plurality of mutually unbiased bases to use to spread a pilot signal for transmission via a first antenna of the plurality of antennas that is associated with a first sector of the plurality of sectors, and wherein the mutually unbiased bases circuitry further is configured to:
   determine a second sequence from the plurality of mutually unbiased bases to use to spread another pilot signal for transmission via a second antenna of the plurality of antennas and associated with a second sector of the plurality of sectors; and
   spread the another pilot signal using the determined second sequence to produce a spread pilot signal for transmission in the second sector.

19. The base station of claim 18, wherein the plurality of mutually unbiased bases are elements of a multi-dimensional matrix, wherein the determined first sequence for spreading the pilot signal for transmission in the first sector comprises a column of the matrix, and wherein the determined second sequence for spreading the pilot signal for transmission in the second sector comprises a different column of the matrix.

20. A user equipment capable of processing a pilot signal in a wireless communication system, the user equipment comprising:
   receiving circuitry that receives a pilot signal on a plurality of antenna via an air interface; and
   mutually unbiased bases circuitry that is configured to determine a sequence from a plurality of mutually unbiased bases to use to despread the received pilot signal, wherein each of the plurality of antennas receives pilot signals on a different group of resource elements of an Orthogonal Frequency Division Multiplexing symbol using sequences from different mutually unbiased bases of the plurality of mutually unbiased bases, and despread the pilot signal using the determined sequence to produce a despread pilot signal.

21. The user equipment of claim 20, further comprising:
   frequency domain channel estimation circuitry that determines a condition of a channel based on the despread pilot signal; and
   a transceiver that transmits an indication of the determined condition of the channel to a base station.

22. The user equipment of claim 20, wherein the receiving circuitry receives a pilot signal from each sector of a plurality of sectors associated with a base station to produce a plurality of received pilot signals and wherein the mutually unbiased bases circuitry is configured to, for each pilot signal of the plurality of received pilot signals, determine a sequence from the plurality of mutually unbiased bases, wherein the sequence determined for the pilot signal is different from the sequence determined for the other pilot signals of the plurality of pilot signals, and despread the pilot signal using the sequence determined for the pilot signal.

23. The user equipment of claim 22, wherein the plurality of mutually unbiased bases comprise a multi-dimensional matrix and wherein each determined sequence comprises a column of the matrix.

24. The user equipment of claim 20, wherein the receiving circuitry receives a pilot signal from each base station of a plurality of base stations to produce a plurality of received pilot signals and wherein the mutually unbiased bases circuitry is configured to, for each pilot signal of the plurality of pilot signals, determine a sequence from a plurality of mutually unbiased bases, wherein the plurality of mutually unbiased bases used to determine a sequence for the pilot signal is different from the plurality of mutually unbiased bases used to determine a sequence for the other pilot signals of the plurality of pilot signals, and despread the pilot signal using the sequence determined for the pilot signal.

25. The user equipment of claim 24, wherein each plurality of mutually unbiased bases used to determine a sequence for a pilot signal comprises a multi-dimensional matrix and wherein each matrix used to determine a sequence for a pilot signal of the plurality of pilot sequences is different from the matrix used to determine a sequence for a different pilot signal of the plurality of pilot sequences.

26. A method for pilot signal processing in a wireless communication system, the method comprising:
    determining a sequence from a plurality of mutually unbiased bases to use to spread a pilot signal for transmission via an antenna of a plurality of antennas, wherein each of the plurality of antennas sends pilot signals on a different group of resource elements of an Orthogonal Frequency Division Multiplexing symbol using sequences from different mutually unbiased bases of the plurality of mutually unbiased bases, wherein different base stations use different set of mutually unbiased bases; and
    spreading the pilot signal using the determined sequence to produce a spread pilot signal.

27. A method for pilot signal processing in a wireless communication system, the method comprising:
    receiving a pilot signal on a plurality of antennas via an air interface;
    determining a sequence from a plurality of mutually unbiased bases to use to despread the received pilot signal, wherein each of the plurality of antennas receives pilot signals on a different group of resource elements of an Orthogonal Frequency Division Multiplexing symbol using sequences from different mutually unbiased bases of the plurality of mutually unbiased bases, wherein different base stations use different set of mutually unbiased bases; and
    despreading the pilot signal using the determined sequence to produce a despread pilot signal.

28. A base station capable of pilot signal processing in a wireless communication system, the base station comprising:
    a plurality of antennas; and
    mutually unbiased bases circuitry that is configured to determine a sequence from a plurality of mutually unbiased bases to use to spread a pilot signal for transmission via an antenna of the plurality of antennas, wherein each of the plurality of antennas sends pilot signals on a different group of resource elements of an Orthogonal Frequency Division Multiplexing symbol using sequences from different mutually unbiased bases of the plurality of mutually unbiased bases, wherein different base stations use different set of mutually unbiased bases and spread the pilot signal using the determined sequence to produce a spread pilot signal.

29. A user equipment capable of processing a pilot signal in a wireless communication system, the user equipment comprising:
    receiving circuitry that receives a pilot signal on a plurality of antenna via an air interface; and
    mutually unbiased bases circuitry that is configured to determine a sequence from a plurality of mutually unbiased bases to use to despread the received pilot signal, wherein each of the plurality of antennas receives pilot signals on a different group of resource elements of an Orthogonal Frequency Division Multiplexing symbol using sequences from different mutually unbiased bases of the plurality of mutually unbiased bases, wherein different base stations use different set of mutually unbiased bases and despread the pilot signal using the determined sequence to produce a despread pilot signal.

* * * * *